(12) United States Patent
Shan et al.

(10) Patent No.: US 10,999,762 B2
(45) Date of Patent: May 4, 2021

(54) INTERNET OF THINGS TRANSMISSION OPTIMIZATION METHOD AND APPARATUS, AND DEVICE

(71) Applicant: Huawei Technologies Co., Ltd., Shenzhen (CN)

(72) Inventors: Baokun Shan, Beijing (CN); Yinghui Yu, Beijing (CN); Chenwan Li, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 28 days.

(21) Appl. No.: 16/054,092

(22) Filed: Aug. 3, 2018

(65) Prior Publication Data
US 2018/0343583 A1     Nov. 29, 2018

Related U.S. Application Data

(63) Continuation of application No. PCT/CN2016/073414, filed on Feb. 4, 2016.

(51) Int. Cl.
| | |
|---|---|
| *H04W 28/06* | (2009.01) |
| *H04L 1/16* | (2006.01) |
| *H04W 28/16* | (2009.01) |
| *H04L 1/18* | (2006.01) |
| *H04L 29/08* | (2006.01) |
| *H04W 24/10* | (2009.01) |

(52) U.S. Cl.
CPC .......... *H04W 28/06* (2013.01); *H04L 1/1635* (2013.01); *H04L 1/1812* (2013.01); *H04L 1/1864* (2013.01); *H04L 67/12* (2013.01); *H04W 24/10* (2013.01); *H04W 28/16* (2013.01)

(58) Field of Classification Search
None
See application file for complete search history.

(56) References Cited

U.S. PATENT DOCUMENTS

2007/0091810 A1*   4/2007   Kim ................. H04L 1/1635
                                                                                  370/236
2009/0086646 A1   4/2009   Kuchibhotla et al.
(Continued)

FOREIGN PATENT DOCUMENTS

| CN | 101064587 A | 10/2007 |
|---|---|---|
| CN | 101855856 A | 10/2010 |

(Continued)

OTHER PUBLICATIONS

CATT, "RLC-AM in NB-IoT," 3GPP TSG RAN WG2 #NB-IOt, R2-160459, Budapest, Hungary, Jan. 19-21, 2016, 4 pages.
(Continued)

*Primary Examiner* — Phirin Sam
*Assistant Examiner* — Sori A Aga
(74) *Attorney, Agent, or Firm* — Slater Matsil, LLP

(57) ABSTRACT

Embodiments provide an Internet of Things transmission optimization method. The method includes: generating, by a receiver side device, first indication information when the receiver side device receives a last PDU sent by a transmitter side device, where the first indication information is indicates whether the receiver side device is to send a status report; and sending, by the receiver side device, the first indication information to the transmitter side device.

19 Claims, 16 Drawing Sheets

(56) References Cited

U.S. PATENT DOCUMENTS

| | | | |
|---|---|---|---|
| 2009/0181703 A1* | 7/2009 | Jiang | H04L 1/1854 |
| | | | 455/466 |
| 2009/0215456 A1* | 8/2009 | Chun | H04W 72/1257 |
| | | | 455/435.1 |
| 2009/0232069 A1 | 9/2009 | Sun et al. | |
| 2012/0163304 A1 | 6/2012 | Chun et al. | |
| 2013/0044726 A1* | 2/2013 | Shrivastava | H04W 28/065 |
| | | | 370/329 |
| 2013/0227371 A1 | 8/2013 | Asterjadhi et al. | |
| 2017/0099611 A1* | 4/2017 | Henttonen | H04W 76/18 |
| 2018/0352457 A1 | 12/2018 | Kim et al. | |

FOREIGN PATENT DOCUMENTS

| | | |
|---|---|---|
| CN | 102487533 A | 6/2012 |
| CN | 102740353 A | 10/2012 |
| CN | 105307259 A | 2/2016 |
| WO | 2010021465 A2 | 2/2010 |
| WO | 2011139069 A2 | 11/2011 |

OTHER PUBLICATIONS

Sony, "AM RLC and DRX for NB-IOT," 3GPP TSG-RAN WG2 Meeting #92, R2-156562, Anaheim, USA, Nov. 16-20, 2015, 4 pages.

\* cited by examiner

INTERNET OF THINGS TRANSMISSION OPTIMIZATION METHOD AND APPARATUS, AND DEVICE

CROSS-REFERENCE TO RELATED APPLICATIONS

This application is a continuation of International Application No. PCT/CN2016/073414, filed on Feb. 4, 2016, the disclosure of which is hereby incorporated by reference in its entirety.

TECHNICAL FIELD

Embodiments of the present application relate to communications technologies, and in particular, to an Internet of Things transmission optimization method and apparatus, and a device.

BACKGROUND

Mobile communication has profoundly changed people's life, but people never stop pursuing higher-performance mobile communication. A 5th Generation (5G) mobile communications system emerges, so as to respond to an explosive growth of mobile data traffic, massive device connections, and various new emerging services and application scenarios in the future. As an important part of 5G, the Internet of Things (IoT) witnesses a rapid growth in market demand. Currently, the 3rd Generation Partnership Project (3GPP) is studying how to carry an Internet of Things service based on a cellular network by designing a new air interface and making full use of a characteristic of a narrowband technology. This type of IoT is referred to as NB-IoT. In comparison with the conventional cellular network, in an NB-IoT network, a service and a terminal device are characterized by the following requirements: a low service rate, a long period, massive connections, low costs, low power consumption, and the like.

In a Long Term Evolution (LTE) system, as a supplement to a hybrid automatic repeat request (HARQ) of a Media Access Control (MAC) layer, an automatic repeat request (ARQ) of a Radio Link Control (RLC) layer is used to trigger RLC layer retransmission using a status report, to further ensure communication reliability. In addition, a status report in LTE is finally sent in a form of a MAC PDU. Therefore, additional signaling overheads caused by a resource request, scheduling, a transmission feedback, and the like are required in addition to transmission of the status report. In LTE, sending and reception at the RLC layer are performed in a window with a length of 512. There are a plurality of status report triggering mechanisms, and each status report can be fed back for a plurality of RLC PDUs.

However, a service feature of NB-IoT decides that a small quantity of protocol data units (PDU), usually only several protocol data units, at the RLC layer are transmitted once in NB-IoT. If an ARQ transmission solution in the LTE system is directly applied to the NB-IoT network, a status report can be fed back only for several RLC PDUs, and therefore efficiency is low. In addition, in the NB-IoT network, to respond to requirements and characteristics of the network, a service, and a terminal, an physical uplink control channel (PUCCH) is deleted, so that a network design is simpler. Therefore, when an uplink status report needs to be sent in an ARQ transmission solution in the NB-IoT network, a PUCCH cannot be used to apply for an uplink resource, and only a random access manner can be used. Consequently, system signaling overheads of the NB-IoT network are further increased.

SUMMARY

Embodiments of the present application provide an Internet of Things transmission optimization method and apparatus, and a device, to resolve a problem that system signaling overheads of an NB-IoT network are further increased because feedback efficiency of a status report at an RLC layer is low and random access is performed to apply for a transmission resource for an uplink status report in NB-IoT.

A first aspect of the present application provides an Internet of Things transmission optimization method. The method includes generating, by a receiver side device, first indication information when the receiver side device receives a last PDU sent by a transmitter side device, where the first indication information indicates whether the receiver side device is to send a status report. The method also includes sending, by the receiver side device, the first indication information to the transmitter side device, so that the transmitter side device determines, based on the first indication information, whether the receiver side device is to send a status report.

With reference to the first aspect, in a first possible implementation of the first aspect, the PDU is a PDU at a protocol layer above a MAC layer.

On the basis of the first possible implementation, if the PDU is an RLC PDU at an RLC layer, the generating, by a receiver side device, first indication information when the receiver side device receives a last protocol data unit PDU sent by a transmitter side device includes: generating, by an RLC layer of the receiver side device, the first indication information when the RLC layer of the receiver side device receives a last RLC PDU sent by the transmitter side device; or sending, by a MAC layer of the receiver side device, query information to an RLC layer of the receiver side device when the MAC layer of the receiver side device forwards, to the RLC layer of the receiver side device, a received PDU sent by the transmitter side device, where the query information queries whether to send a status report to the transmitter side device; and when the MAC layer of the receiver side device receives a response indication returned by the RLC layer of the receiver side device, generating, by the MAC layer of the receiver side device, the first indication information based on the response indication.

Further, the sending, by the receiver side device, the first indication information to the transmitter side device includes: sending, by the MAC layer of the receiver side device, the first indication information to the transmitter side device.

On the basis of the first possible implementation, the sending, by the receiver side device, the first indication information to the transmitter side device includes: sending, by the MAC layer of the receiver side device, an acknowledgement message to the transmitter side device using a pre-obtained first resource used to send an ACK of a MAC PDU corresponding to the PDU, where the acknowledgement message includes the ACK and the first indication information.

On the basis of any one of the foregoing implementation solutions, if the first indication information indicates that the receiver side device is to send a status report, the method further includes: determining, by the receiver side device, a second resource used to send a status report; and generating, by the receiver side device, a status report, and sending the status report to the transmitter side device using the second resource.

Further, if the PDU is an RLC PDU, the generating, by the receiver side device, a status report, and sending the status report to the transmitter side device using the second resource includes: generating, by the RLC layer of the receiver side device, the status report, and sending the status report to the MAC layer of the receiver side device; and sending, by the MAC layer of the receiver side device, the status report to the transmitter side device using the second resource.

On the basis of any one of the foregoing implementation solutions, optionally, the first indication information includes n bits, n is a positive integer, and n indicates a quantity of RLC entities.

When all RLC PDUs corresponding to an RLC entity are successfully received, a bit corresponding to the RLC entity indicates that no status report needs to be sent; or when there is an unsuccessfully received RLC PDU that corresponds to an RLC entity, a bit corresponding to the RLC entity indicates that a status report needs to be sent.

In another implementation of the first aspect, if the receiver side device is user equipment, and the transmitter side device is a base station, the determining, by the receiver side device, a second resource used to send a status report includes: receiving, by the user equipment, second resource information that is used to send the status report and that is sent by the base station; and determining, by the user equipment, the second resource based on the second resource information.

Before the sending, by the receiver side device, the first indication information to the transmitter side device, the method further includes: receiving, by the user equipment, first resource information that is used to send the first indication information and that is sent by the base station; and obtaining, by the user equipment, the first resource based on the first resource information.

A second aspect of the present application provides an Internet of Things transmission optimization method. The method includes sending, by a transmitter side device, a last PDU to a receiver side device. The method also includes receiving, by the transmitter side device, first indication information sent by the receiver side device, and determining, based on the acknowledgement message, whether the receiver side device is to send a status report, where the first indication information is information that is generated by the receiver side device and that indicates whether the receiver side device is to send a status report. The method also includes determining, by the transmitter side device if the transmitter side device determines, based on the first indication information, that the receiver side device is to send no status report, that all sent PDUs are received by the receiver side device.

With reference to the second aspect, in a first possible implementation of the second aspect, the method further includes: if the transmitter side device determines, based on the first indication information, that the receiver side device is to send a status report, receiving, by the transmitter side device on a second resource used to send a status report, a status report sent by the receiver side device.

On the basis of any one of the foregoing solutions, the PDU is a PDU at a protocol layer above a MAC layer.

With reference to the foregoing solution, in a second implementation of the second aspect, if the PDU is an RLC PDU at an RLC layer, the determining, by the transmitter side device if the transmitter side device determines, based on the first indication information, that the receiver side device is to send no status report, that all sent PDUs are received by the receiver side device includes: if a MAC layer of the transmitter side device determines, based on the first indication information, that the receiver side device is to send no status report, sending, by the MAC layer of the transmitter side device, a transmission acknowledgement message to an RLC layer of the transmitter side device, so that the RLC layer of the transmitter side device determines that all sent RLC PDUs are received; or sending, by a MAC layer of the transmitter side device, the first indication information to an RLC layer of the transmitter side device, and determining, by the RLC layer of the transmitter side device based on the first indication information, that all sent RLC PDUs are received.

With reference to the second aspect, in a third implementation of the second aspect, the receiving, by the transmitter side device, first indication information sent by the receiver side device includes: receiving, by the transmitter side device, an acknowledgement message sent by the receiver side device, where the acknowledgement message includes a MAC PDU acknowledgment character corresponding to the PDU and the first indication message.

On the basis of any one of the foregoing solutions, the first indication information includes n bits, n is a positive integer, and n indicates a quantity of RLC entities.

Further, when all RLC PDUs corresponding to an RLC entity are successfully received, a bit corresponding to the RLC entity indicates that no status report is to be sent; or when there is an unsuccessfully received RLC PDU that corresponds to an RLC entity, a bit corresponding to the RLC entity indicates that a status report is to be sent.

With reference to the first implementation, in a fourth possible implementation of the second aspect, if the receiver side device is user equipment, and the transmitter side device is a base station, the receiving, by the transmitter side device on a second resource used to send a status report, a status report sent by the receiver side device includes: determining, by the base station, the second resource information used to send a status report, and sending the second resource information to the user equipment; and receiving, by the base station, a status report sent by the user equipment on the second resource.

A third aspect of the present application provides an Internet of Things transmission optimization method. The method includes receiving, by user equipment, a last PDU sent by a base station. The method also includes receiving, by the user equipment, first resource information that is used for a status report and that is sent by the base station. The method also includes generating, by the user equipment, a status report, and sending the status report to the base station using a first resource corresponding to the first resource information.

A fourth aspect of the present application provides an Internet of Things transmission optimization method. The method includes sending, by a base station, a last PDU to user equipment. The method also includes scheduling, by the base station for the user equipment, first resource information used for a status report, and sending the first resource information to the user equipment. The method also includes receiving, by the base station on a first resource corresponding to the first resource information, a status report sent by the user equipment.

With reference to the fourth aspect, in a first possible implementation of the fourth aspect, before the scheduling, by the base station for the user equipment, first resource information used for a status report, the method further includes: receiving, by the base station, an ACK that corresponds to the PDU and that is sent by the user equipment.

A fifth aspect of the present application provides an Internet of Things transmission optimization apparatus. The apparatus includes a receiving module, configured to receive a PDU sent by a transmitter side device. The apparatus also includes a processing module, configured to generate first indication information when the receiving module receives a last PDU sent by the transmitter side device, where the first indication information indicates whether the Internet of Things transmission optimization apparatus is to send a status report. The apparatus also includes a sending module, configured to send the first indication information to the transmitter side device, so that the transmitter side device determines, based on the first indication information, whether the Internet of Things transmission optimization apparatus is to send a status report.

Optionally, the PDU received by the receiving module is a PDU at a protocol layer above a MAC layer.

Optionally, if the PDU is an RLC PDU at an RLC layer, the processing module is configured to: generate the first indication information when an RLC layer of the Internet of Things transmission optimization apparatus receives a last RLC PDU sent by the transmitter side device; or send, by a MAC layer of the receiver side device, query information to an RLC layer of the receiver side device when the MAC layer of the Internet of Things transmission optimization apparatus forwards, to the RLC layer of the receiver side device, a received PDU sent by the transmitter side device, where the query information queries whether to send a status report to the transmitter side device; and when the MAC layer of the receiver side device receives a response indication returned by the RLC layer of the receiver side device, generate, by the MAC layer of the receiver side device, the first indication information based on the response indication.

Optionally, the sending module includes: a first MAC layer sending unit, configured to send the first indication information to the transmitter side device.

Optionally, the sending module includes: a second MAC layer sending unit, configured to send an acknowledgement message to the transmitter side device using a pre-obtained first resource used to send an ACK of a MAC PDU corresponding to the PDU, where the acknowledgement message includes the ACK and the first indication information.

Optionally, if the first indication information indicates that the Internet of Things transmission optimization apparatus is to send a status report, the Internet of Things transmission optimization apparatus further includes: a determining module, configured to determine a second resource used to send a status report; where the processing module is further configured to generate a status report; and the sending module is further configured to send the status report to the transmitter side device using the second resource.

Further, if the PDU is an RLC PDU, the processing module includes an RLC layer processing unit, configured to generate the status report; and the sending module further includes: a first RLC layer sending unit, configured to send the status report to the MAC layer of the Internet of Things transmission optimization apparatus; and a third MAC layer sending unit, configured to send the status report to the transmitter side device using the second resource.

Optionally, the first indication information generated by the processing module includes n bits, n is a positive integer, and n indicates a quantity of RLC entities.

Further, if the Internet of Things transmission optimization apparatus is user equipment, and the transmitter side device is a base station, the determining module includes: a first receiving unit, configured to receive second resource information that is used to send the status report and that is sent by the base station; and a determining unit, configured to determine the second resource based on the second resource information.

Further, the receiving module is further configured to receive first resource information that is used to send the first indication information and that is sent by the base station; and the determining module is further configured to determine the first resource based on the first resource information.

A sixth aspect of the present application provides an Internet of Things transmission optimization apparatus. The apparatus includes a sending module, configured to send a last PDU to a receiver side device. The apparatus also includes a receiving module, configured to receive first indication information sent by the receiver side device. The apparatus also includes a processing module, configured to determine, based on the acknowledgement message, whether the receiver side device is to send a status report, where the first indication information is information that is generated by the receiver side device and that indicates whether the receiver side device is to send a status report. If the processing module determines, based on the first indication information, that the receiver side device is to send no status report, the processing module is further configured to determine that all PDUs sent by the sending module are received by the receiver side device.

Optionally, if the processing module determines, based on the first indication information, that the receiver side device is to send a status report, the receiving module is further configured to receive, on a second resource used to send a status report, a status report sent by the receiver side device.

Optionally, the PDU sent by the sending module is a PDU at a protocol layer above a MAC layer.

Optionally, if the PDU is an RLC PDU at an RLC layer, the processing module includes a MAC layer processing unit and an RLC layer processing unit; and the sending module includes a MAC layer sending unit; and if the MAC layer processing unit determines, based on the first indication information, that the receiver side device is to send no status report, the MAC layer sending unit is configured to send a transmission acknowledgement message to an RLC layer of the transmitter side device, so that the RLC layer processing unit determines that all RLC PDUs sent by the sending module are received; or the MAC layer sending unit sends the first indication information to an RLC layer of the Internet of Things transmission optimization apparatus, and the RLC layer of the Internet of Things transmission optimization apparatus determines, based on the first indication information, that all sent RLC PDUs are received.

Optionally, the receiving module is further configured to receive an acknowledgement message sent by the receiver side device, where the acknowledgement message includes a MAC PDU acknowledgment character corresponding to the PDU and the first indication message.

Optionally, the first indication information received by the receiving module includes n bits, n is a positive integer, and n indicates a quantity of RLC entities.

Optionally, if the receiver side device is user equipment, and the Internet of Things transmission optimization apparatus is a base station, the receiving module includes: a determining unit, configured to determine the second resource information used to send a status report; a sending unit, configured to send the second resource information to the user equipment; and a receiving unit, configured to receive a status report sent by the user equipment on the second resource.

A seventh aspect of the present application provides an Internet of Things transmission optimization apparatus. The apparatus includes a first receiving module, configured to receive a last PDU sent by a base station. The apparatus also includes a second receiving module, configured to receive first resource information that is used for a status report and that is sent by the base station. The apparatus also includes a processing module, configured to generate a status report. The apparatus also includes a sending module, configured to send the status report to the base station using a first resource corresponding to the first resource information.

An eighth aspect of the present application provides an Internet of Things transmission optimization apparatus. The apparatus includes a sending module, configured to send a last PDU to user equipment. The apparatus also includes a processing module, configured to schedule, for the user equipment, first resource information used for a status report. The sending module is further configured to send the first resource information to the user equipment. The apparatus also includes a receiving module, configured to receive, on a first resource corresponding to the first resource information, a status report sent by the user equipment.

Optionally, before the processing module schedules, for the user equipment, the first resource information used for a status report, the receiving module is further configured to receive an ACK that corresponds to the PDU and that is sent by the user equipment.

A ninth aspect of the present application provides a receiver side device. The receiver side device includes a processor configured to control execution of an executable instruction. The receiver side device also includes a memory configured to store the executable instruction of the processor, a receiver, and a transmitter. The receiver is configured to receive a PDU sent by a transmitter side device. The processor is configured to generate first indication information when the receiver receives a last PDU sent by the transmitter side device. The first indication information indicates whether the receiver side device is to send a status report. The transmitter is configured to send the first indication information to the transmitter side device, so that the transmitter side device determines, based on the first indication information, whether the receiver side device is to send a status report.

A tenth aspect of the present application provides a transmitter side device. The transmitter side device includes a processor configured to control execution of an executable instruction. The transmitter side device also includes a memory configured to store the executable instruction of the processor, a receiver, and a transmitter. The transmitter is configured to send a last PDU to a receiver side device. The receiver is configured to receive first indication information sent by the receiver side device. The processor is configured to determine, based on the acknowledgement message, whether the receiver side device is to send a status report, where the first indication information is information that is generated by the receiver side device and that is used to indicate whether the receiver side device is to send a status report. If the processor determines, based on the first indication information, that the receiver side device is to send no status report, the processor is further configured to determine that all PDUs sent by the transmitter are received by the receiver side device.

An eleventh aspect of the present application provides user equipment. The user equipment includes a processor configured to control execution of an executable instruction. The user equipment also includes a memory configured to store the executable instruction of the processor, a receiver, and a transmitter. The receiver is configured to: receive a last PDU sent by a base station. The receiver is also configured to receive first resource information that is used for a status report and that is sent by the base station. The processor is configured to generate a status report. The transmitter is configured to send the status report to the base station using a first resource corresponding to the first resource information.

A twelfth aspect of the present application provides a base station. The base station includes a processor configured to control execution of an executable instruction. The base station also includes a memory configured to store the executable instruction of the processor, a receiver, and a transmitter. The transmitter is configured to send a last PDU to user equipment. The processor is configured to schedule, for the user equipment, first resource information used for a status report. The transmitter is further configured to send the first resource information to the user equipment. The receiver is configured to receive, on a first resource corresponding to the first resource information, a status report sent by the user equipment.

According to the Internet of Things transmission optimization method and apparatus, and the device provided in the present application, after receiving the last PDU, the receiver side device generates the first indication information, and sends the first indication information to the transmitter side device, so that the transmitter side device determines, based on the first indication information, whether all the sent PDUs are received, in other words, determines whether the receiver side device is to send a status report. No status report needs to be sent when it is determined that all the PDUs are correctly received, and a status report is to be sent only when there is an unsuccessfully received PDU. In this way, a status report does not need to be fed back anytime. In addition, the first indication information indirectly implements a resource application function for an uplink status report, thereby effectively reducing network system signaling overheads.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Figure 1:
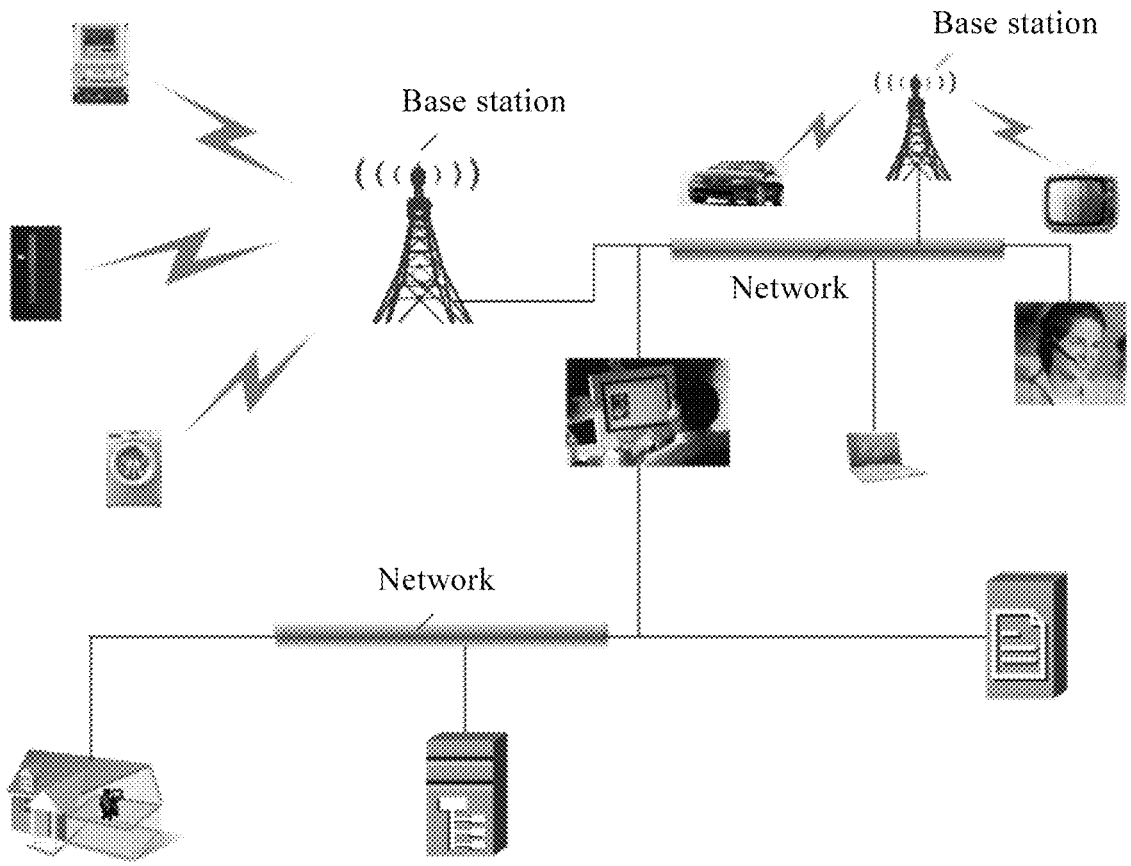
FIG. 1 is a schematic diagram of an application scenario of an Internet of Things transmission optimization method according to the present application.

FIG. 1 is a schematic diagram of an application scenario of an Internet of Things (IoT) transmission optimization method according to the present application. A solution of the present application may be applied to a wireless communications system with large network coverage, a plurality of connections, and a low-cost and low-power consumption terminal, for example, an IoT communications system, shown in FIG. 1, with a low-cost and low-power consumption terminal. The application scenario or the wireless communications system may include a plurality of base stations, and a coverage area of each base station may include a plurality of user equipment, such as a refrigerator, a washer, a car, a television, a computer, a water meter, and an electricity meter. The user equipment implements communication using a wireless network or a cellular network. A service of the IoT communications system generates a small packet and is not quite delay-sensitive, so that massive user terminal devices can be deployed. The user terminal devices may include smart water/electricity meters, smart home devices, smart wearable devices, and the like that are massively deployed. A large quantity of such devices may be connected to one base station. If an ARQ mechanism in LTE is directly used, on the IoT, because a MAC layer sequentially delivers RLC PDUs, a status report needs to be fed back for each RLC PDU, and therefore system signaling overheads are significantly increased. Therefore, in view of a characteristic that an RLC layer can sequentially receive PDUs, an Internet of Things transmission optimization method is provided, to improve an ARQ procedure of the RLC layer in an IoT system and optimize a status report triggering and processing mechanism. In this way, signaling overheads are reduced to meet a low-power consumption requirement of the IoT system.

Figure 2:
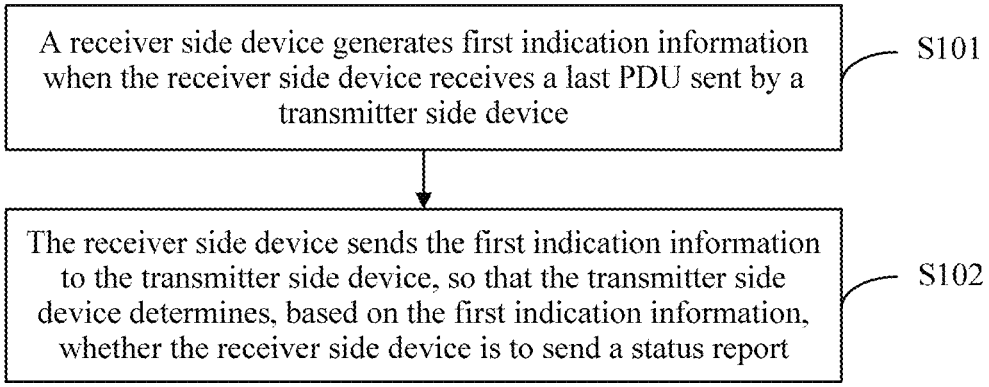
FIG. 2 is a flowchart of an Internet of Things transmission optimization method according to Embodiment 1 of the present application.

FIG. 2 is a flowchart of an Internet of Things transmission optimization method according to Embodiment 1 of the present application. As shown in FIG. 2, on the basis of the application scenario shown in FIG. 1, the method is performed by a receiver side device. The receiver side device may be a base station or user-side user equipment. The Internet of Things transmission optimization method includes the following steps.

S101. The receiver side device generates first indication information when the receiver side device receives a last PDU sent by a transmitter side device.

In this embodiment, the first indication information indicates whether the receiver side device is to send a status report. The PDU is a PDU at a protocol layer above a MAC layer, for example, an RLC PDU at an RLC layer, a Packet Data Convergence Protocol (PDCP) PDU at a PDCP layer, a radio resource control (RRC) PDU at an RRC layer, or another possible PDU delivered to the MAC layer. The receiver side device receives one or more PDUs sent by the transmitter side device. When detecting that a received PDU is the last PDU, the receiver side device generates the first indication information indicating whether to send a transmission report. The receiver side device determines, in at least the following manner, whether a PDU is the last PDU: when detecting that a PDU carries a polling bit, determining, by the receiver side device, that the PDU is the last PDU sent by the transmitter side device.

In this solution, if all PDUs are received, the first indication information indicates that no status report is to be sent; or there is an unsuccessfully received PDU, the first indication information indicates that a transmission report is to be sent.

S102. The receiver side device sends the first indication information to the transmitter side device, so that the transmitter side device determines, based on the first indication information, whether the receiver side device is to send a status report.

In this step, the receiver side device sends the generated first indication information to the transmitter side device, so that the transmitter side device determines, based on the first indication information, whether the receiver side device is to send a status report. If no status report is to be sent, the transmitter side device determines that all sent PDUs are successfully received; or if the transmitter side device determines, based on the first indication information, that the receiver side device needs to send a status report, the transmitter side device needs to receive a status report sent by the receiver side device and retransmit an unsuccessfully received PDU based on an indication in the status report, so as to ensure transmission reliability.

An idea of this solution is to trigger status report sending only when there is a PDU that is unsuccessfully received by the receiver side device. Status report sending may be triggered when it is detected that there is an unsuccessfully received PDU, or status report sending may be triggered when a last PDU is sent, the receiver side device detects that the last PDU is received, and there is an unsuccessfully received PDU previously. If all PDUs are successfully received, no status report needs to be sent. The status report includes a transmission status report.

According to the Internet of Things transmission optimization method provided in this embodiment, after receiving the last PDU, the receiver side device generates the first indication information, and sends the first indication information to the transmitter side device, so that the transmitter side device determines, based on the first indication information, whether all the sent PDUs are received, in other words, determines whether the receiver side device is to send a status report. No status report needs to be sent when it is determined that all the PDUs are correctly received, and a status report is to be sent only when there is an unsuccessfully received PDU. In this way, a status report does not need to be fed back for each PDU. In addition, the first indication information indirectly implements a resource application function for an uplink status report, thereby effectively reducing network system signaling overheads.

Figure 3:
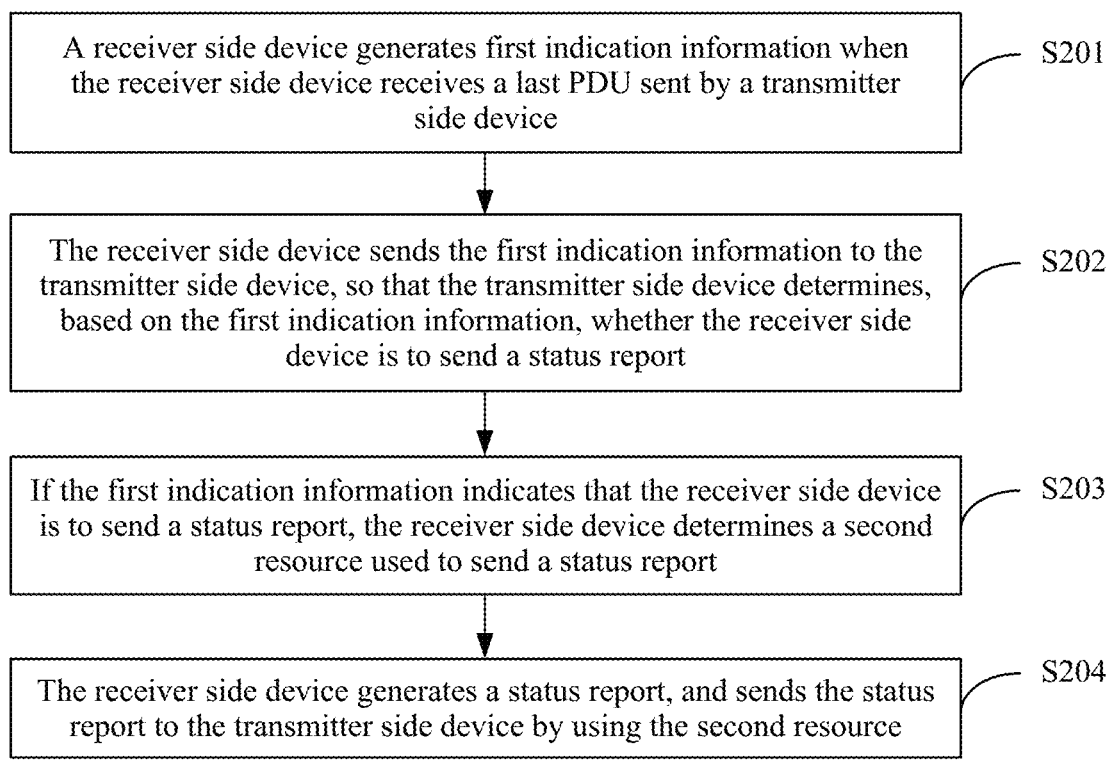
FIG. 3 is a flowchart of an Internet of Things transmission optimization method according to Embodiment 2 of the present application.

FIG. 3 is a flowchart of an Internet of Things transmission optimization method according to Embodiment 2 of the present application. As shown in FIG. 3, on the basis of the foregoing embodiment, this embodiment provides a specific transmission optimization method, including the following steps.

S201. A receiver side device generates first indication information when the receiver side device receives a last PDU sent by a transmitter side device.

S202. The receiver side device sends the first indication information to the transmitter side device, so that the transmitter side device determines, based on the first indication information, whether the receiver side device is to send a status report.

Specific implementations of the foregoing two steps are similar to those in Embodiment 1. When receiving the last PDU, the receiver side device generates the first indication information indicating whether to send a status report, and sends the first indication information to the transmitter side device.

S203. If the first indication information indicates that the receiver side device is to send a status report, the receiver side device determines a second resource used to send a status report.

In this step, if the receiver side device determines that there is an unsuccessfully received PDU and a status report needs to be sent, in other words, the first indication information indicates that a status report is to be sent, after sending the first indication information to the transmitter side device, the receiver side device needs to obtain a resource used to send a status report (in other words, used for a status report). If the receiver side device is user-side user equipment such as a terminal device, and the transmitter side device is a network-side device such as a base station, the receiver side device needs to apply to the transmitter side device for the second resource; or if the receiver side device is a network-side device such as a base station, the receiver side device may allocate the second resource used to transmit the status report.

S204. The receiver side device generates a status report, and sends the status report to the transmitter side device using the second resource.

After determining the second resource, the receiver side device generates the status report based on a PDU reception status, where the status report includes at least information indicating an unsuccessfully received PDU, and sends the status report on the second resource, so that the transmitter side device retransmits, based on the status report, the unsuccessfully transmitted PDU indicated by the status report.

In this solution, in an example in which the receiver side device is user equipment, and the transmitter side device is a base station, the receiver side device determines, in the following manner, the second resource used to send a status report: receiving, by the user equipment, second resource information that is used to send the status report and that is sent by the base station, and determining, by the user equipment, the second resource based on the second resource information.

The second resource scheduled by the base station for the user equipment is in a physical downlink control channel (PDCCH). The user equipment needs to monitor the PDCCH, and sends corresponding data, to be specific, the status report, on a corresponding location of a physical downlink shared channel (PDSCH)/physical uplink link channel (PUSCH).

In an implementation, before the sending, by the receiver side device, the first indication information to the transmitter side device, the user equipment receives first resource information that is used to send the first indication information and that is sent by the base station, and the user equipment obtains a first resource based on the first resource information.

This means that, if the receiver side device is user equipment, before the first indication information is sent, the base station needs to schedule, for the user equipment, the first resource used to send the first indication information. A scheduling manner may be similar to that of the second resource.

According to the Internet of Things transmission optimization method provided in this embodiment, after receiving the last PDU, the receiver side device generates the first indication information, and sends the first indication information to the transmitter side device. After determining that the first indication information indicates that a status report is to be sent, the receiver side device determines the second resource used to send a status report, and sends the status report on the resource, so that the transmitter side device receives the status report and retransmits the unsuccessfully transmitted PDU, so as to improve transmission reliability. In addition, a status report needs to be sent only when the first indication information indicates that a status report is to be sent; or if the first indication information indicates that no status report is to be sent, no status report needs to be sent. In this way, a status report does not need to be fed back for each PDU. In addition, the first indication information indirectly implements a resource application function for an uplink status report, thereby effectively reducing network system signaling overheads.

The following uses an example in which a PDU is a Radio Link Control (RLC) PDU at an RLC layer between devices to describe the foregoing Internet of Things transmission optimization method in detail.

Figure 4:
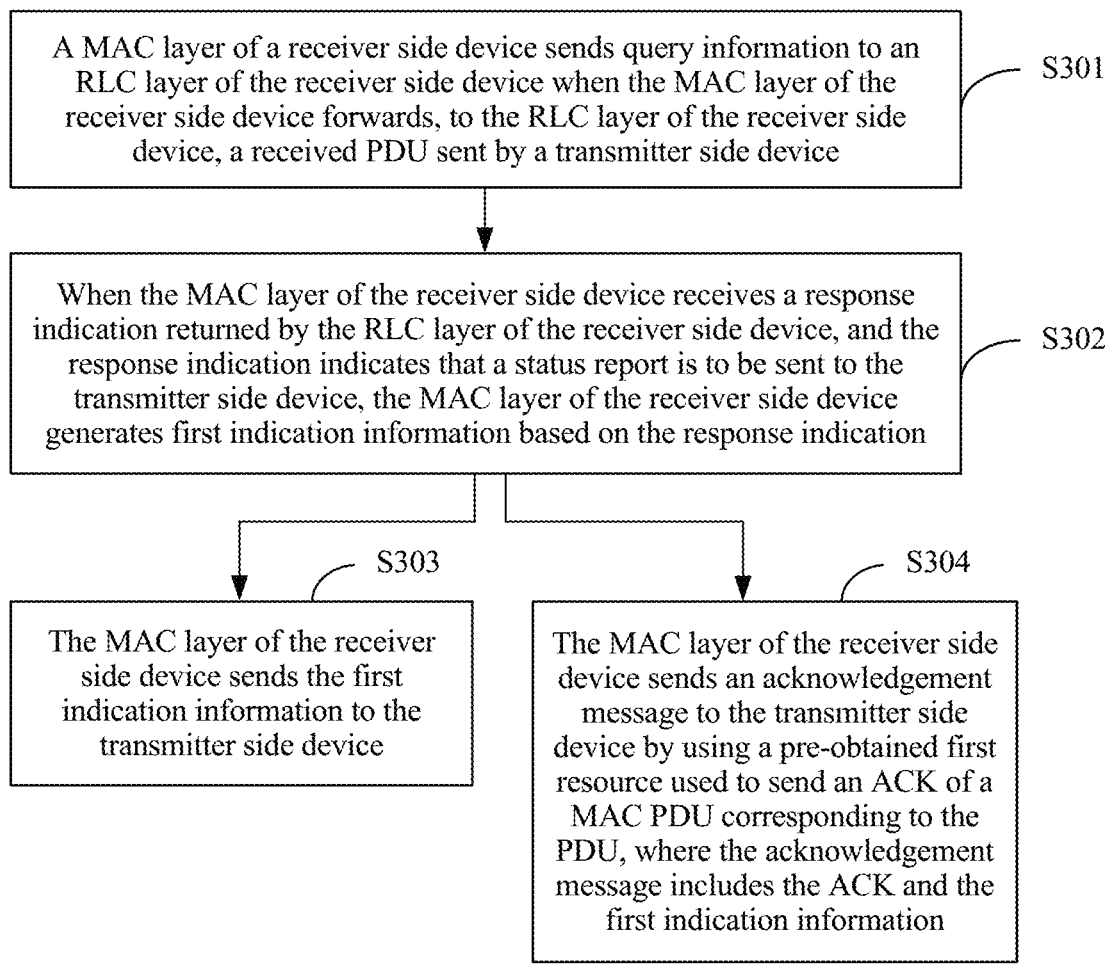
FIG. 4 is a flowchart of an Internet of Things transmission optimization method according to Embodiment 3 of the present application.

FIG. 4 is a flowchart of an Internet of Things transmission optimization method according to Embodiment 3 of the present application. As shown in FIG. 4, on the basis of the application scenario shown in FIG. 1 and the foregoing embodiment, if the PDU is an RLC PDU at an RLC layer, the Internet of Things transmission optimization method may be implemented as follows.

S301. A MAC layer of a transmitter side device sends query information to an RLC layer of the receiver side device when the MAC layer of the receiver side device forwards, to the RLC layer of the receiver side device, a received PDU sent by the transmitter side device.

The query information queries whether to send a status report to the transmitter side device.

S302. When the MAC layer of the receiver side device receives a response indication returned by the RLC layer of the receiver side device, the MAC layer of the receiver side device generates first indication information based on the response indication.

Steps S301 and S302 have the following meaning: After delivering an RLC PDU to the RLC layer, the MAC layer needs to send a query request to the RLC layer, to query the RLC layer whether a status report needs to be sent to the transmitter side device. If a status report needs to be sent, the RLC layer needs to make a response to the MAC layer, so that the MAC layer generates the first indication information based on the response indication.

Optionally, when the RLC layer of the receiver side device receives a last RLC PDU sent by the transmitter side device, the RLC layer of the receiver side device generates the first indication information. In other words, the RLC layer of the receiver side device may generate the first indication information based on an RLC PDU reception status.

In an implementation, the receiver side device sends the first indication information to the transmitter side device in two manners. The MAC layer may encapsulate the first indication information and directly send the first indication information (step S303); or the MAC layer may send the first indication information to the transmitter side device when sending an acknowledgement character (ACK) (step S304).

S303. The MAC layer of the receiver side device sends the first indication information to the transmitter side device.

Steps S303 and S304 are parallel steps, and one of them needs to be performed. In other words, the MAC layer sends the first indication information to the transmitter side device.

S304. The MAC layer of the receiver side device sends an acknowledgement message to the transmitter side device using a pre-obtained first resource used to send an ACK of a MAC PDU corresponding to the PDU, where the acknowledgement message includes the ACK and the first indication information.

In this embodiment, if the first indication information indicates that a status report needs to be sent, in other words, there is an unsuccessfully received RLC PDU in a process of receiving an RLC PDU, the receiver side device needs to determine a second resource used to transmit a status report. For a specific manner, refer to Embodiment 2. A specific implementation in which after obtaining the second resource used to send a status report, the receiver side device generates a status report, and sends the status report to the transmitter side device using the second resource is as follows: generating, by the RLC layer of the receiver side device, the status report, and sending the status report to the MAC layer of the receiver side device; and sending, by the MAC layer of the receiver side device, the status report to the transmitter side device using the second resource.

In any one of the foregoing embodiments, a specific implementation of the first indication information is as follows. The first indication information includes n bits, n is a positive integer, and n indicates a quantity of RLC entities.

Optionally, each of the n bits in the first indication information corresponds to one RLC entity; or if there are n radio bearers at the RLC layer, the first indication information may be n bits, and n corresponds to a quantity of radio bearers.

When all RLC PDUs corresponding to an RLC entity are successfully received, a bit corresponding to the RLC entity indicates that no status report needs to be sent; or when there is an unsuccessfully received RLC PDU that corresponds to an RLC entity, a bit corresponding to the RLC entity indicates that a status report needs to be sent.

For example, when all RLC PDUs of an RLC entity corresponding to a bearer are successfully received, an indication indicates that no status report needs to be sent. For example, a corresponding indication may be 0. When there is an unsuccessfully received RLC PDU of an RLC entity that corresponds to the bearer, the indication indicates that a status report needs to be sent, so as to require retransmission of the lost RLC PDU. A corresponding indication may be 1.

According to the Internet of Things transmission optimization method provided in this embodiment, the receiver side device generates the first indication information, and sends the first indication information to the transmitter side device, so that the transmitter side device determines, based on the first indication information, whether the receiver side device needs to send a status report. If all PDUs are correctly received, no status report needs to be sent, and a status report is to be sent only when there is an unsuccessfully received PDU. In an example of an RLC PDU at the RLC layer, the RLC layer sends both the first indication information and the status report to the MAC layer, and then the MAC layer sends the first indication information and the status report to the transmitter side device. In this way, fewer status reports are transmitted, and signaling overheads and power consumption are reduced.

Figure 5:
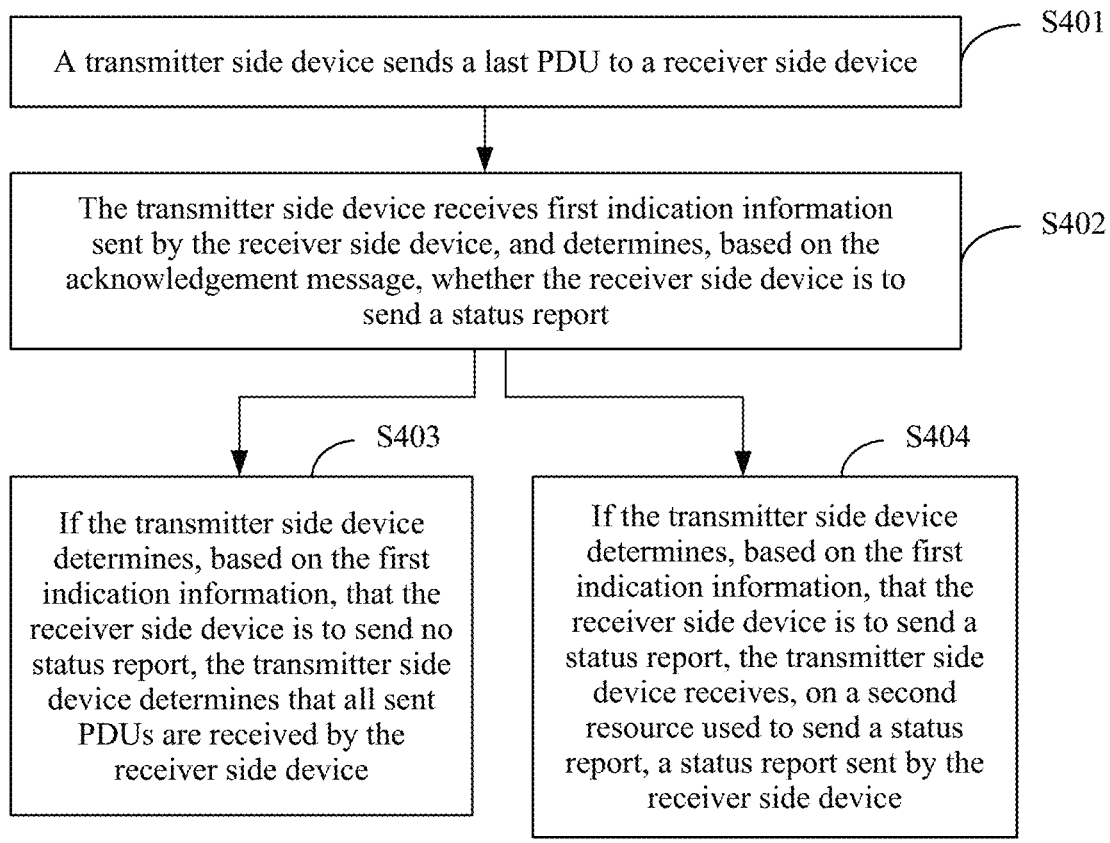
FIG. 5 is a flowchart of an Internet of Things transmission optimization method according to Embodiment 4 of the present application.

FIG. 5 is a flowchart of an Internet of Things transmission optimization method according to Embodiment 4 of the present application. As shown in FIG. 5, on the basis of the application scenario shown in FIG. 1, the solution is performed by a transmitter side device. The transmitter side device may be user-side user equipment or a network device such as a base station. The Internet of Things transmission optimization method includes the following implementation steps.

S401. The transmitter side device sends a last PDU to a receiver side device.

In this step, corresponding to Embodiment 1, the transmitter side device needs to send a PDU to the receiver side device. When the transmitter side device sends the last PDU, a polling indication may be carried, or another manner may be used, so that the receiver side device can determine that the PDU is the last PDU.

Likewise, the PDU is a PDU at a protocol layer above a Media Access Control MAC layer.

S402. The transmitter side device receives first indication information sent by the receiver side device, and determines, based on the acknowledgement message, whether the receiver side device is to send a status report.

In this embodiment, the first indication information is information that is generated by the receiver side device and that indicates whether the receiver side device is to send a status report.

Optionally, the transmitter side device receives the first indication information in two manners. In Manner 1, the transmitter side device receives the first indication information on a first resource exclusively used to transmit the first indication information.

In Manner 2, the transmitter side device receives an acknowledgement message sent by the receiver side device, where the acknowledgement message includes a MAC PDU acknowledgment character corresponding to the PDU and the first indication message.

S403. If the transmitter side device determines, based on the first indication information, that the receiver side device is to send no status report, the transmitter side device determines that all sent PDUs are received by the receiver side device.

If the first indication information indicates that the receiver side device is to send no status report, the transmitter side device may determine that all the sent PDUs are correctly received by the receiver side device, data transmission is completed, and neither a transmission report needs to be received nor retransmission is required.

S404. If the transmitter side device determines, based on the first indication information, that the receiver side device is to send a status report, the transmitter side device receives, on a second resource used to send a status report, a status report sent by the receiver side device.

If the first indication information indicates that the receiver side device is to send a status report, the transmitter side device determines that there is an unsuccessfully received PDU in sent data, and therefore needs to prepare to receive the status report returned by the receiver side device, and needs to retransmit the unsuccessfully received PDU indicated by the status report, so as to ensure transmission reliability.

Optionally, in step S404, if the receiver side device is user equipment, and the transmitter side device is a base station, the receiving, by the transmitter side device on a second resource used to send a status report, a status report sent by the receiver side device includes: determining, by the base station, the second resource information used to send a status report, and sending the second resource information to the user equipment; and receiving, by the base station, the status report sent by the user equipment on the second resource. The base station needs to schedule a resource, and sends corresponding second resource information to the user equipment, so that the user equipment sends the status report on the corresponding resource. For an example scheduling manner, refer to Embodiment 2.

According to the Internet of Things transmission optimization solution provided in this embodiment, the transmitter side device sends the PDU to the receiver side device, receives the first indication information sent by the receiver side device, and determines, based on the first indication information, whether the receiver side device is to send a status report. If the transmitter side device determines that the receiver side device is to send no status report, the transmitter side device may determine that all the sent PDUs are correctly received; or if the transmitter side device determines that the receiver side device is to send a status report, the transmitter side device determines that there is an unsuccessfully received PDU, and therefore the transmitter side device receives the status report sent by the receiver side device, and retransmits the unsuccessfully transmitted PDU indicated by the status report, so as not to receive a status report for each PDU while improving transmission reliability. In addition, the first indication information indirectly implements a resource application function for an uplink status report, thereby effectively reducing network system signaling overheads.

Figure 6:
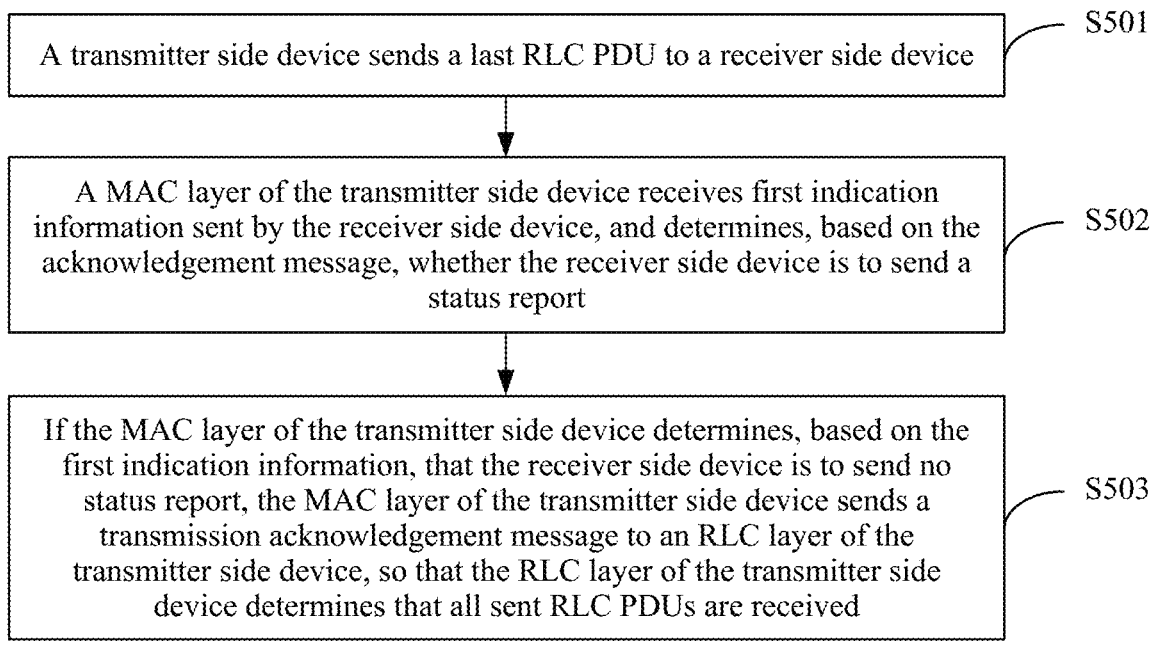
FIG. 6 is a flowchart of an Internet of Things transmission optimization method according to Embodiment 5 of the present application.

FIG. 6 is a flowchart of an Internet of Things transmission optimization method according to Embodiment 5 of the present application. As shown in FIG. 6, on the basis of Embodiment 5, an example in which the PDU is an RLC PDU at an RLC layer is used to describe in detail implementation steps of a transmitter side device in the foregoing Internet of Things transmission optimization method.

S501. The transmitter side device sends a last RLC PDU to a receiver side device.

S502. A MAC layer of the transmitter side device receives first indication information sent by the receiver side device, and determines, based on the acknowledgement message, whether the receiver side device is to send a status report.

S503. If the MAC layer of the transmitter side device determines, based on the first indication information, that the receiver side device is to send no status report, the MAC layer of the transmitter side device sends a transmission acknowledgement message to an RLC layer of the transmitter side device, so that the RLC layer of the transmitter side device determines that all sent RLC PDUs are received.

Optionally, when the first indication information sent by the receiver side device is generated by a MAC layer based on a response message of an RLC layer, in step S503, when receiving the first indication information, the MAC layer of the transmitter side device needs to deliver the first indication information to the RLC layer of the transmitter side device, so that the RLC layer determines a reception status of the sent PDU based on the first indication information. In other words, the MAC layer of the transmitter side device sends the first indication information to the RLC layer of the transmitter side device, and the RLC layer of the transmitter side device determines, based on the first indication information, that all the sent RLC PDUs are received.

In this step, if the MAC layer of the transmitter side device determines, based on the first indication information, that the receiver side device is to send a status report, the MAC layer of the transmitter side device receives a status report on a second resource used to send a status report, and sends the status report to the RLC layer of the transmitter side device, so that the RLC layer retransmits an unsuccessfully received RLC PDU indicated by the status report. A manner of receiving the status report may be as follows: The RLC layer of the transmitter side device receives, on the second resource used to send a status report, the status report sent by the receiver side device. Then the RLC layer of the transmitter side device retransmits, to the RLC layer of the receiver side device, the unsuccessfully received RLC PDU indicated by the status report.

In any one of the foregoing embodiments, the first indication information includes n bits, n is a positive integer, and n indicates a quantity of RLC entities.

When all RLC PDUs corresponding to an RLC entity are successfully received, a bit corresponding to the RLC entity indicates that no status report is to be sent; or when there is an unsuccessfully received RLC PDU that corresponds to an RLC entity, a bit corresponding to the RLC entity indicates that a status report is to be sent.

In the foregoing solution, if the first indication information received by the transmitter side device is generated by the RLC layer of the receiver side device, the MAC layer the transmitter side device needs to deliver the first indication information to the RLC layer of the transmitter side device, so that the RLC layer determines, based on the first indication information, whether all the sent PDUs are correctly received by a peer end. If the first indication information received by the transmitter side device is generated by the MAC layer of the receiver side device based on the response message of the RLC layer, the MAC layer of the transmitter side device may determine, based on the first indication information, whether all the sent PDUs are correctly received by a peer end, and notify the RLC layer of the result.

Optionally, for example, when all RLC PDUs of an RLC entity corresponding to the bearer are successfully received, the indication indicates that no status report needs to be sent. For example, a corresponding indication may be 0. When there is an unsuccessfully received RLC PDU of an RLC entity that corresponds to the bearer, the indication indicates that a status report needs to be sent, so that a base station is required to retransmit the lost RLC PDU. A corresponding indication may be 1.

According to the Internet of Things transmission optimization method provided in this embodiment, the transmitter side device sends the RLC PDU to the receiver side device, receives the first indication information sent by the receiver side device, and determines, based on the first indication information, whether the receiver side device is to send a status report. If the transmitter side device determines that the receiver side device is to send no status report, the transmitter side device may determine that all the sent RLC PDUs are correctly received; or if the transmitter side device determines that the receiver side device is to send a status report, the transmitter side device determines that there is an unsuccessfully received PDU. In an example of an RLC PDU at the RLC layer, the RLC layer sends both the first indication information and the status report to the MAC layer, and then the MAC layer sends the first indication information and the status report to the transmitter side device. In this way, fewer status reports are transmitted, and signaling overheads and power consumption are reduced.

With reference to the foregoing embodiment, a base station and user equipment are used as examples to describe the solution of the Internet of Things transmission optimization method in detail. There is a downlink status report for uplink data transmission from the user equipment to the base station, and there is an uplink status report for downlink data transmission from the base station to the user equipment.

Figure 7:
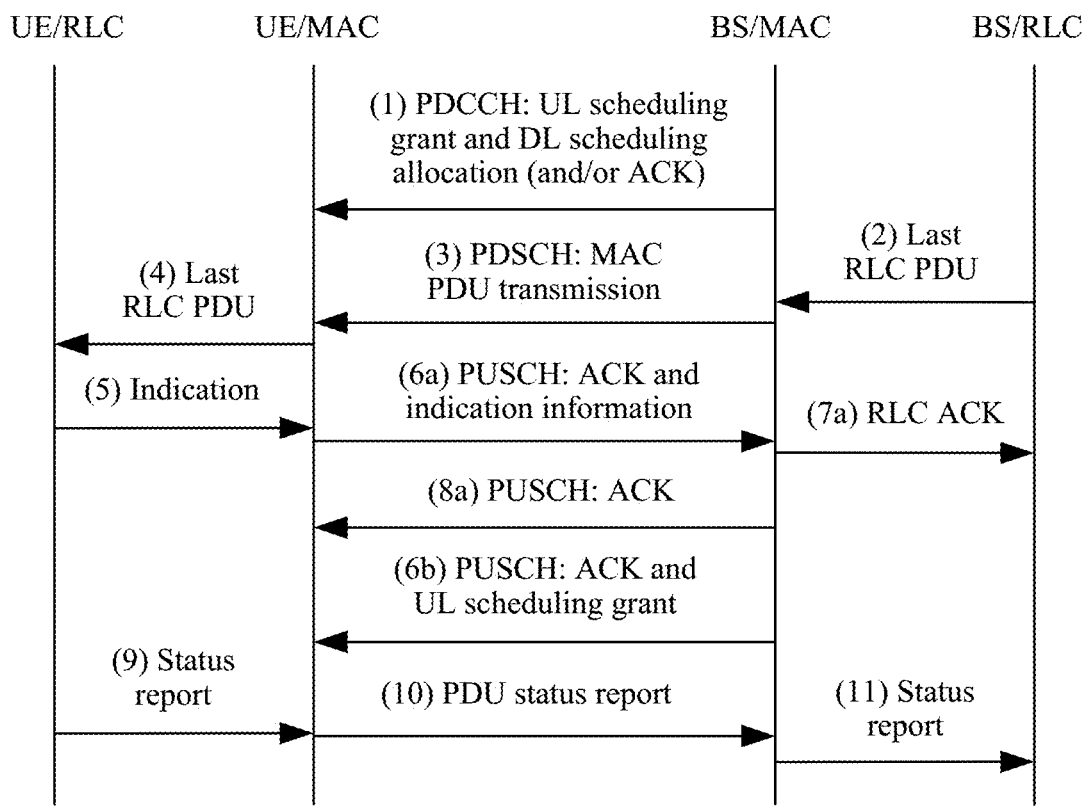
FIG. 7 is an interaction flowchart of an instance of an Internet of Things transmission optimization method according to the present application.

FIG. 7 is an interaction flowchart of an instance of an Internet of Things transmission optimization method according to the present application. As shown in FIG. 7, an uplink status report is optimized in this instance. A status report is to be sent only when there is an unsuccessfully transmitted RLC PDU at an RLC layer, and no status report needs to be sent if all RLC PDUs are successfully sent (and successfully received). As shown in FIG. 7, specific steps are as follows.

(1) PDCCH: uplink (UL) scheduling grant and downlink (DL) scheduling allocation (and/or ACK): A base station (BS) schedules a transmission resource for a current downlink MAC PDU, and schedules, for UE, an uplink resource for feeding back an acknowledgement (ACK)/negative acknowledgement (NACK) for the MAC PDU. Scheduling may be performed for the ACK together with scheduling for UL and DL, or may be performed separately.

(2) Last RLC PDU: An RLC layer of the base station sends a last RLC PDU to a MAC layer of the base station.

(3) PDSCH: MAC PDU transmission: The MAC layer of the base station processes the RLC PDU to obtain a MAC PDU, and transmits the MAC PDU to a MAC layer of the user equipment (UE).

(4) Last RLC PDU: The MAC layer of the UE processes the received MAC PDU to obtain the RLC PDU, and sends the last RLC PDU to an RLC layer of the UE.

(5) Indication: The RLC layer of the user equipment determines an RLC PDU reception status to generate an indication (the first indication information in the foregoing embodiment), and sends the indication to the MAC layer of the user equipment.

(6a) PUSCH: ACK and indication information: In specific implementation, the MAC layer of the user equipment sends the indication information and an acknowledgement character (ACK) of the sent RLC PDU to the MAC layer of the BS using a PUSCH.

(7a) RLC ACK: The MAC layer of the BS forwards the ACK to the RLC layer of the BS.

(8a) PDCCH: ACK: The MAC layer of the BS returns the acknowledgement character to the MAC layer of the user equipment.

(6b) PDCCH: ACK and UL scheduling grant: If the indication information indicates that a status report needs to be sent, the base station directly schedules a resource used to send a status report, and sends the resource together with the ACK to the user equipment using a PDCCH.

(9) Status report: The RLC layer of the user equipment generates a status report corresponding to the RLC PDU reception status, and sends the status report to the MAC layer of the user equipment.

(10) PDU status report: The MAC layer of the user equipment sends the status report corresponding to the PDU to the MAC layer of the BS.

(11) Status report: The MAC layer of the BS forwards the status report to the RLC layer of the BS. If the base station determines that there is an unsuccessfully received RLC PDU, the base station retransmits the RLC PDU.

In this solution, as shown in FIG. 7, when receiving the last RLC PDU, the RLC layer of the UE sends an indication to the MAC layer, to indicate whether a resource for an uplink status report needs to be sent or indicate whether an uplink status report is to be sent, and the MAC layer transmits the indication together with an ACK/NACK of the MAC layer to the base station at a transmit end. The indication is determined in the following method.

If there are n radio bearers at the RLC layer, the indication may be n bits corresponding to all the radio bearers.

When all RLC PDUs of an RLC entity corresponding to the bearer are successfully received, the indication indicates that no status report needs to be sent, in other words, no uplink resource is required. For example, a corresponding indication may be 0. When there is an unsuccessfully received RLC PDU of an RLC entity that corresponds to the bearer, the indication indicates that a status report needs to be sent, so that the base station is required to retransmit the lost RLC PDU. In this case, an uplink resource is required, and a corresponding indication may be 1.

After the base station at the transmit end receives the indication, if an indication corresponding to a bearer is 0, it indicates that all RLC PDUs of the bearer are successfully received, and the MAC layer indicates, to a corresponding entity at the RLC layer, that no status report needs to be received for the bearer. The indication is equivalent to an ACK at the RLC layer. If an indication corresponding to a bearer is 1, it indicates that there is an unsuccessfully transmitted RLC PDU of the bearer, and a status report needs to be sent. In this case, the base station may continue to schedule an uplink resource for the UE, so that the UE sends a status report for the corresponding bearer. NOTE: In this solution, the RLC layer needs to confirm a HARQ ACK/NACK before the MAC layer feeds back the HARQ ACK/NACK.

Figure 8:
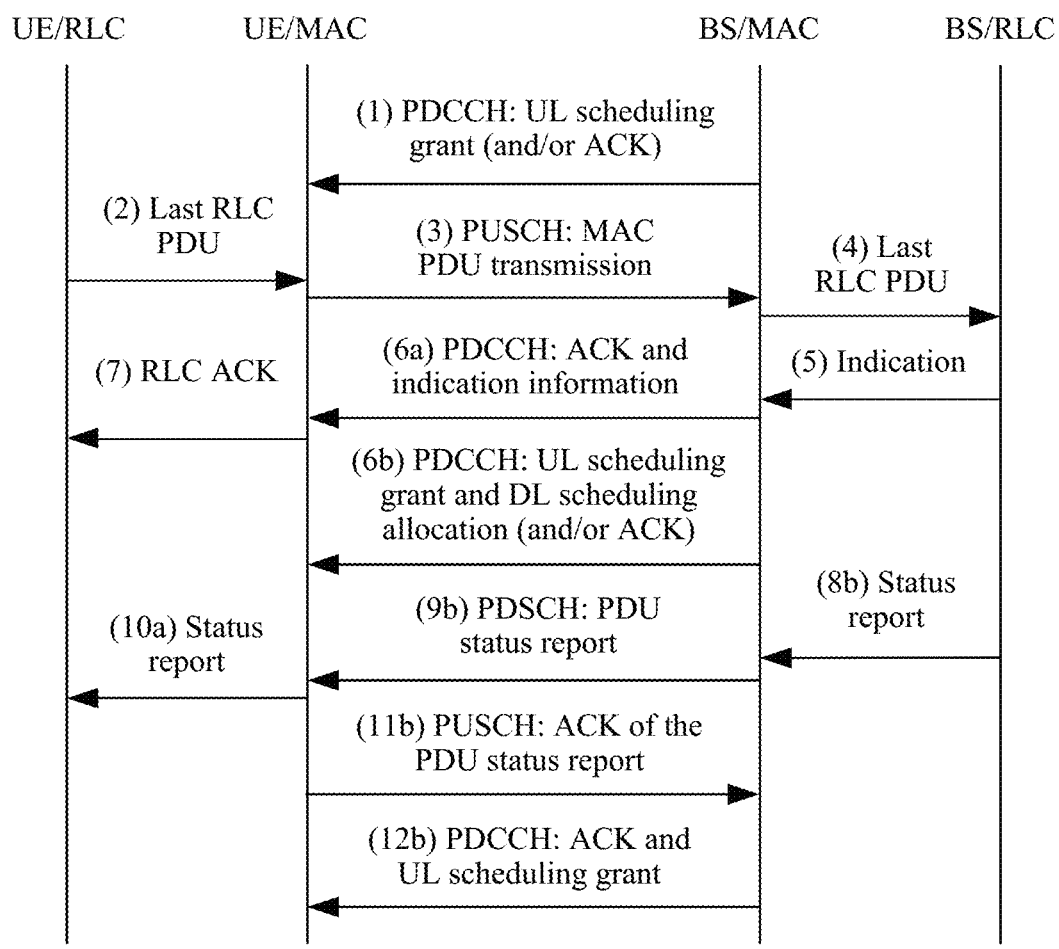
FIG. 8 is an interaction flowchart of another instance of an Internet of Things transmission optimization method according to the present application.

FIG. 8 is an interaction flowchart of another instance of an Internet of Things transmission optimization method according to the present application. As shown in FIG. 8, a downlink status report is optimized in this instance. A status report is to be sent only when there is an unsuccessfully transmitted RLC PDU at an RLC layer, and no status report needs to be sent if all RLC PDUs are successfully sent (and successfully received). As shown in FIG. 8, specific steps are as follows:

(1) PDCCH: UL scheduling grant (and/or ACK): A base station schedules a transmission resource for a current downlink MAC PDU, and schedules, for UE, an uplink resource for feeding back an ACK/NACK for the MAC PDU.

(2) Last RLC PDU: An RLC layer of the UE sends a last RLC PDU to a MAC layer of the UE.

(3) PUSCH: MAC PDU transmission: The MAC layer of the UE processes the RLC PDU to obtain a MAC PDU, and transmits the MAC PDU to a MAC layer of the BS using a PUSCH.

(4) Last RLC PDU: The MAC layer of the BS processes the received MAC PDU to obtain the RLC PDU, and sends the last RLC PDU to an RLC layer of the BS.

(5) Indication: The RLC layer of the BS determines an RLC PDU reception status to generate an indication (the first indication information in the foregoing embodiment), and sends the indication to the MAC layer of the BS.

(6a) PDCCH: ACK and indication information: In specific implementation, the MAC layer of the BS sends the indication information and an acknowledgement character (ACK) of the sent RLC PDU to the MAC layer of the UE using a PDCCH.

(6b) PDCCH: UL scheduling grant and DL scheduling allocation (and/or ACK): The base station schedules the transmission resource for the current downlink MAC PDU, and schedules the resource for feeding back the ACK/NACK for the MAC PDU by the user equipment (Likewise, scheduling may not be performed for the ACK together with scheduling of a UL resource or a DL resource).

(8b) Status report: The RLC layer of the BS generates a status report corresponding to the RLC PDU reception status, and sends the status report to the MAC layer of the BS.

(9b) PDSCH: PDU status report: The MAC layer of the BS sends the status report corresponding to the PDU to the MAC layer of the UE.

(10a) Status report: The MAC layer of the UE forwards the status report to the RLC layer of the UE.

(11b) PUSCH: ACK of the PDU status report: The UE returns an ACK of the status report to the BS.

(12b) PDCCH: ACK and UL scheduling grant: The base station schedules a retransmission resource, and the UE retransmits an unsuccessfully received RLC PDU.

As shown in FIG. 8, a status report is sent in downlink for uplink transmission. After receiving the last RLC PDU, the RLC layer of the base station sends an indication to the MAC layer, to indicate whether a downlink resource needs to be scheduled to send a status report, and the MAC layer transmits the indication together with an ACK/NACK of the MAC layer to the user equipment at a transmit end. The indication is determined in the following method.

If there are n radio bearers at the RLC layer, the indication may be n bits corresponding to all the radio bearers.

When all RLC PDUs of an RLC entity corresponding to the bearer are successfully received, the indication indicates that no status report needs to be sent, in other words, there is subsequently no downlink resource for the bearer. For example, a corresponding indication may be 0. When there is an unsuccessfully received RLC PDU of an RLC entity that corresponds to the bearer, the indication indicates that a status report needs to be sent, so that the UE is required to retransmit the lost RLC PDU. In this case, there is subsequently a downlink resource for the bearer, to send a status report, and a corresponding indication may be 1.

After the UE at the transmit end receives the indication, if an indication corresponding to a bearer is 0, it indicates that all RLD PDUs of the bearer are successfully received, and the MAC layer indicates, to a corresponding entity at the RLC layer, that no status report needs to be received for the bearer. The indication is equivalent to an ACK at the RLC layer. If an indication corresponding to a bearer is 1, it indicates that there is an unsuccessfully transmitted RLC PDU of the bearer, a downlink resource scheduled by the base station needs to be received, and then a status report needs to be received. NOTE: In this solution, the RLC layer needs to confirm a HARQ ACK/NACK before the MAC layer feeds back the HARQ ACK/NACK.

In the solutions provided in the foregoing two instances, for transmission of an RLC PDU at an RLC layer, status report sending is triggered only when there is an unsuccessfully received RLC PDU, in other words, an unsuccessfully transmitted RLC PDU. In this way, a status report does not need to be sent each time, and signaling overheads are effectively reduced.

To reduce system signaling overheads and power consumption, a status report triggering condition is optimized in the foregoing embodiment. In the solutions, an uplink status report may also be optimized from a perspective of resource scheduling: No random access channel (RACH) is used. For a specific manner, refer to the following embodiment.

Figure 9:
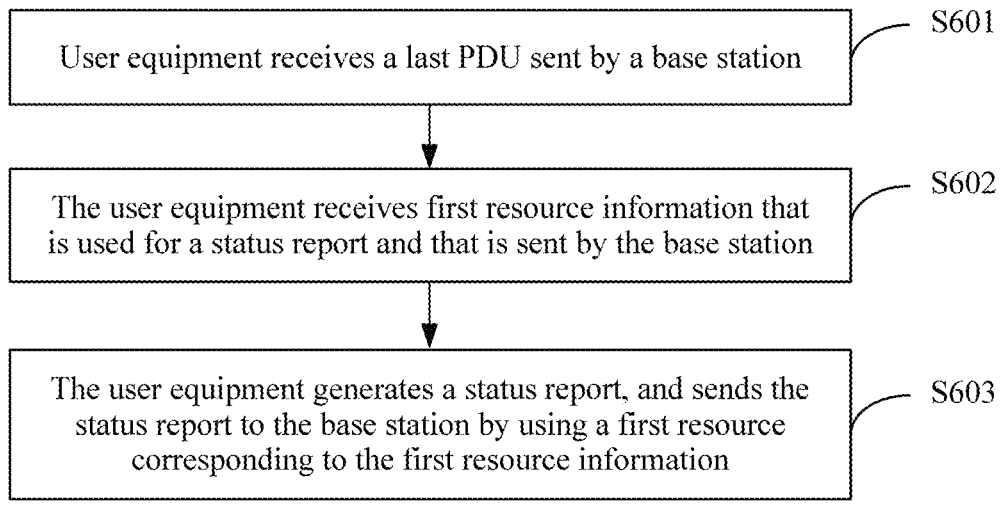
FIG. 9 is a flowchart of an Internet of Things transmission optimization method according to Embodiment 6 of the present application.

FIG. 9 is a flowchart of an Internet of Things transmission optimization method according to Embodiment 6 of the present application. As shown in FIG. 9, in the application scenario shown in FIG. 1, a case in which the receiver side device is UE, and a transmitter side device is a base station for an uplink status report is used to describe the transmission optimization solution. Specific steps are as follows.

S601. The user equipment receives a last PDU sent by the base station.

Optionally, when receiving the last RLC PDU, the user equipment may send an acknowledgement character to the base station.

S602. The user equipment receives first resource information that is used for a status report and that is sent by the base station.

In this embodiment, a PDU is transmitted in downlink. The UE receives a PDU sent by the base station, and after detecting that the received PDU is the last PDU, the UE does not need to apply for a resource used to send a status report, but instead, the base station actively schedules, for the UE, the first resource information used to send a status report, and the UE receives the first resource information sent by the base station, and obtains a corresponding first resource based on the first resource information.

S603. The user equipment generates a status report, and sends the status report to the base station using a first resource corresponding to the first resource information.

The UE generates the status report corresponding to the PDU, and sends the status report on the first resource scheduled by the base station, so that the base station receives the status report, the base station determines, based on the status report, whether there is an unsuccessfully received PDU, and if there is an unsuccessfully received PDU, retransmits the unsuccessfully received PDU.

In this embodiment, the PDU may be a PDU at a protocol layer above a MAC layer.

Specifically, an RLC PDU is used as an example, and the generating, by the user equipment, a status report, and sending the status report to the base station may specifically include: generating, by an RLC layer of the user equipment, the status report, and sending the status report to an RLC layer of the base station using the first resource.

On the basis of the foregoing solution, if the status report indicates that there is an RLC PDU that is unsuccessfully received by the user equipment, the user equipment needs to receive the RLC PDU retransmitted by the base station based on the status report.

The receiving, by the user equipment, the RLC PDU retransmitted by the base station based on the status report includes: receiving, by the RLC layer of the user equipment, the RLC PDU retransmitted by the RLC layer of the base station based on the status report.

Although both transmission of the status report and transmission of the PDU are performed between RLC layers, a MAC layer of each device is required for transmission in specific implementation. For details, refer to the data transmission in FIG. 7 or FIG. 8.

According to the Internet of Things transmission optimization method provided in this embodiment, after the UE receives the last PDU sent by the base station, the base station actively schedules the resource required for the status report and notifies the UE of the resource, and the UE sends the status report on the resource scheduled by the base station. In other words, the base station directly schedules an uplink resource for the UE, so as to prevent the UE from obtaining a resource in a random access manner, an application manner, or another manner. In this way, system signaling overheads are effectively reduced, and power consumption is reduced.

Figure 10:
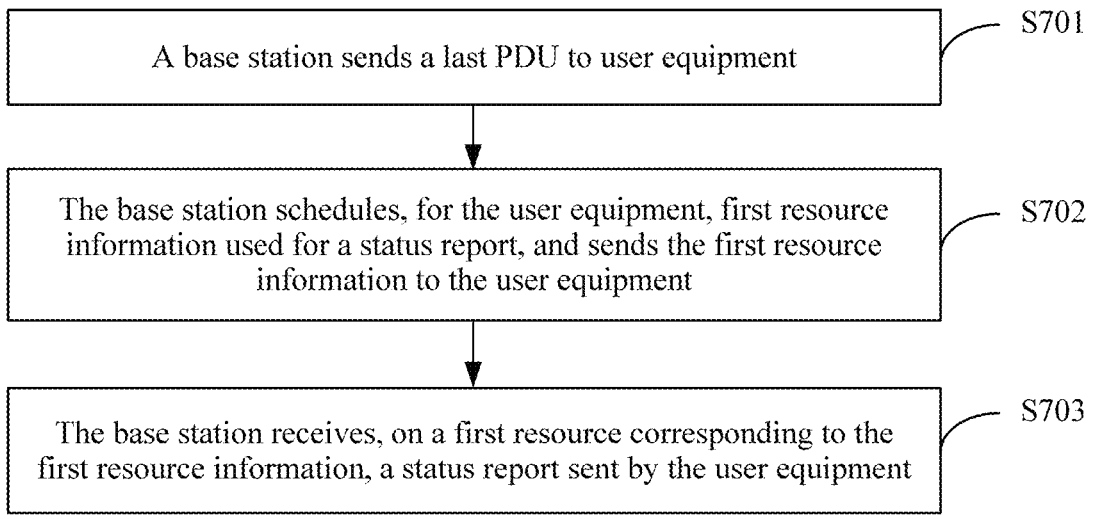
FIG. 10 is a flowchart of an Internet of Things transmission optimization method according to Embodiment 7 of the present application.

FIG. 10 is a flowchart of an Internet of Things transmission optimization method according to Embodiment 7 of the present application. As shown in FIG. 10, on the basis of the foregoing embodiment, for an uplink status report, the transmission optimization solution is described from a perspective of a transmitter side device, to be specific, a base station. Specific steps are as follows.

S701. The base station sends a last PDU to user equipment.

S702. The base station schedules, for the user equipment, first resource information used for a status report, and sends the first resource information to the user equipment.

In this embodiment, after sending the last PDU to the UE, the base station actively schedules an uplink resource, and sends the scheduled first resource information to the UE, so that the UE obtains, based on the resource information, a corresponding first resource for sending a status report after the status report is generated.

S703. The base station receives, on a first resource corresponding to the first resource information, a status report sent by the user equipment.

In this solution, before the base station schedules, for the user equipment, the first resource information used for a status report, the base station receives an acknowledgement character (ACK) that corresponds to the PDU and that is sent by the user equipment. This means that, before the base station schedules, for the user equipment, the resource used to send a status report, the base station needs to determine that the UE has received the last PDU sent by the base station, in other words, the base station needs to receive the ACK.

Likewise, the PDU in this solution may be a PDU at a protocol layer above a MAC layer.

An RLC PDU is used as an example, and the transmission optimization solution may be implemented as follows. The base station sends a last RLC PDU to the user equipment. When the base station receives an acknowledgement character that corresponds to the RLC PDU and that is sent by the user equipment, the base station schedules, for the user equipment, the first resource information used for a status report, and sends the first resource information to the user equipment, and an RLC layer of the base station receives, on the first resource, the status report sent by an RLC layer of the user equipment.

If the status report indicates that there is an RLC PDU that is unsuccessfully received by the user equipment, the base station retransmits, to the user equipment based on the status report, the RLC PDU that is unsuccessfully received by the user equipment. To be specific, the RLC layer of the base station retransmits, to the RLC layer of the user equipment based on the status report, the PDU that is unsuccessfully received by the user equipment.

According to the Internet of Things transmission optimization method provided in this embodiment, after the base station sends the last PDU to the UE, the base station actively schedules the resource required for the status report and notifies the UE of the resource, and the UE sends the status report on the resource scheduled by the base station. In other words, the base station directly schedules an uplink resource for the UE, so as to prevent the UE from obtaining a resource in a random access manner, an application manner, or another manner. In this way, system signaling overheads are effectively reduced, and power consumption is reduced.

Figure 11:
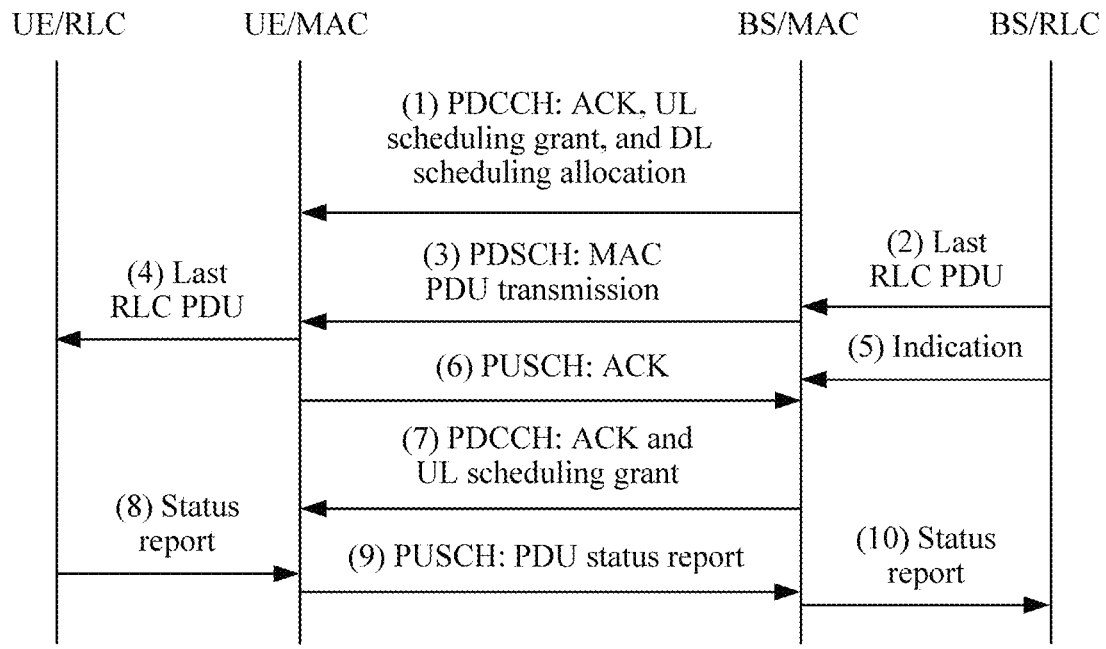
FIG. 11 is an interaction flowchart of still another instance of an Internet of Things transmission optimization method according to the present application.

FIG. 11 is an interaction flowchart of still another instance of an Internet of Things transmission optimization method according to the present application. As shown in FIG. 11, on the basis of Embodiment 6 and Embodiment 7, a scheduling optimization solution for an uplink status report is specifically implemented as follows.

(1) PDCCH: UL scheduling grant and DL scheduling allocation (and/or ACK): A BS schedules a transmission resource for a current downlink MAC PDU, and schedules, for UE, an uplink resource for feeding back an acknowledgement (ACK)/negative acknowledgement (NACK) for the MAC PDU. Scheduling may be performed for the ACK together with scheduling for UL and DL, or may be performed separately.

(2) Last RLC PDU: An RLC layer of the base station sends a last RLC PDU to a MAC layer of the base station.

(3) PDSCH: MAC PDU transmission (4) Last RLC PDU: The MAC layer of the UE processes the received MAC PDU to obtain the RLC PDU, and sends the last RLC PDU to an RLC layer of the UE.

(5) Indication: The RLC layer of the base station sends an indication to the MAC layer of the base station, to indicate that the last RLC PDU is transmitted to the UE.

(6) PUSCH: ACK: The MAC layer of the user equipment sends an ACK of the sent RLC PDU to the MAC layer of the BS using a PUSCH.

(7) PDCCH: ACK and UL scheduling grant: The base station directly schedules a resource used to send a status report, and sends the resource together with the ACK to the user equipment using a PDCCH.

(8) Status report: The RLC layer of the user equipment generates a status report corresponding to an RLC PDU reception status, and sends the status report to the MAC layer of the user equipment.

(9) PUSCH: PDU status report: The MAC layer of the user equipment sends the status report corresponding to the PDU to the MAC layer of the BS.

(10) Status report: The MAC layer of the BS forwards the status report to the RLC layer of the BS. If the base station determines that there is an unsuccessfully received RLC PDU, the base station retransmits the RLC PDU.

As shown in FIG. 11, when delivering the last RLC PDU to the MAC layer, the RLC layer of the base station indicates, to the MAC layer, that the last RLC PDU is sent. In this case, after receiving the ACK from the UE, the MAC layer learns that the last RLC PDU is successfully received by a receive end. Therefore, the base station may directly schedule an uplink resource for the UE, so that the UE can send the status report.

According to the Internet of Things transmission optimization method provided in this solution, the base station directly schedules an uplink resource for the UE, so as to prevent the UE from obtaining a resource in a random access manner, an application manner, or another manner. In this way, system signaling overheads are effectively reduced, and power consumption is reduced.

Figure 12:
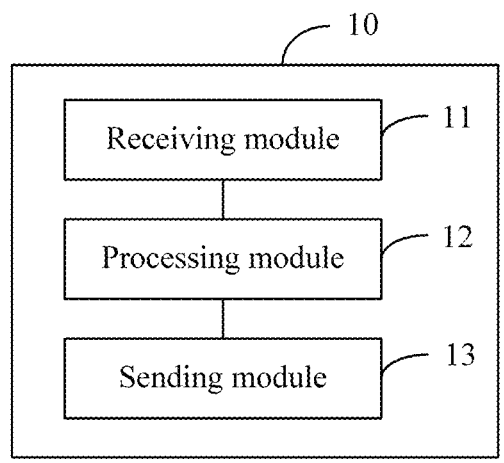
FIG. 12 is a schematic structural diagram of an Internet of Things transmission optimization apparatus according to Embodiment 1 of the present application.

FIG. 12 is a schematic structural diagram of an Internet of Things transmission optimization apparatus according to Embodiment 1 of the present application. As shown in FIG. 12, the Internet of Things transmission optimization apparatus 10 includes: a receiving module 11, configured to receive a protocol data unit (PDU) sent by a transmitter side device; a processing module 12, configured to generate first indication information when the receiving module 11 receives a last PDU sent by the transmitter side device, where the first indication information indicates whether the Internet of Things transmission optimization apparatus is to send a status report; and a sending module 13, configured to send the first indication information to the transmitter side device, so that the transmitter side device determines, based on the first indication information, whether the Internet of Things transmission optimization apparatus is to send a status report.

Optionally, the PDU received by the receiving module 11 is a PDU at a protocol layer above a Media Access Control (MAC) layer.

The Internet of Things transmission optimization apparatus provided in this embodiment is configured to perform the technical solutions of the receiver side device in the embodiments shown in FIG. 2 to FIG. 8, and an implementation principle and a technical effect of the apparatus are similar to those of the receiver side device. After the receiving module receives the last PDU, the processing module generates the first indication information, and the sending module sends the first indication information to the transmitter side device, so that the transmitter side device determines, based on the first indication information, whether all sent PDUs are received, in other words, determines whether the receiver side device is to send a status report. No status report needs to be sent when it is determined that all the PDUs are correctly received, and a status report is to be sent only when there is an unsuccessfully received PDU. In this way, a status report does not need to be fed back for each PDU, and network system signaling overheads are effectively reduced.

On the basis of the foregoing embodiment, if the PDU is a Radio Link Control (RLC) PDU at an RLC layer, the processing module 12 is configured to: generate the first indication information when an RLC layer of the Internet of Things transmission optimization apparatus receives a last RLC PDU sent by the transmitter side device; or send, by a MAC layer of the receiver side device, query information to an RLC layer of the receiver side device when the MAC layer of the receiver side device forwards, to the RLC layer of the receiver side device, a received PDU sent by the transmitter side device, where the query information queries whether to send a status report to the transmitter side device; and when the MAC layer of the receiver side device receives a response indication returned by the RLC layer of the receiver side device, generate, by the MAC layer of the receiver side device, the first indication information based on the response indication.

Figure 13:
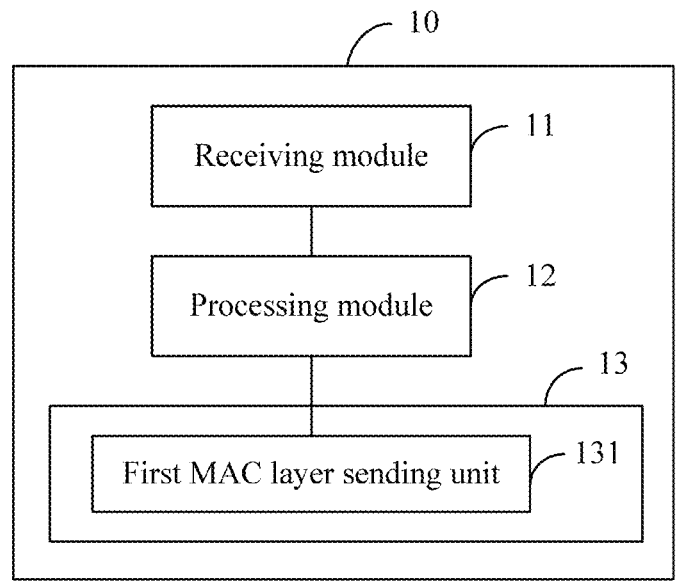
FIG. 13 is a schematic structural diagram of an Internet of Things transmission optimization apparatus according to Embodiment 2 of the present application.

FIG. 13 is a schematic structural diagram of an Internet of Things transmission optimization apparatus according to Embodiment 2 of the present application. As shown in FIG. 13, the sending module 13 includes: a first MAC layer sending unit 131, configured to send the first indication information to the transmitter side device.

Figure 14:
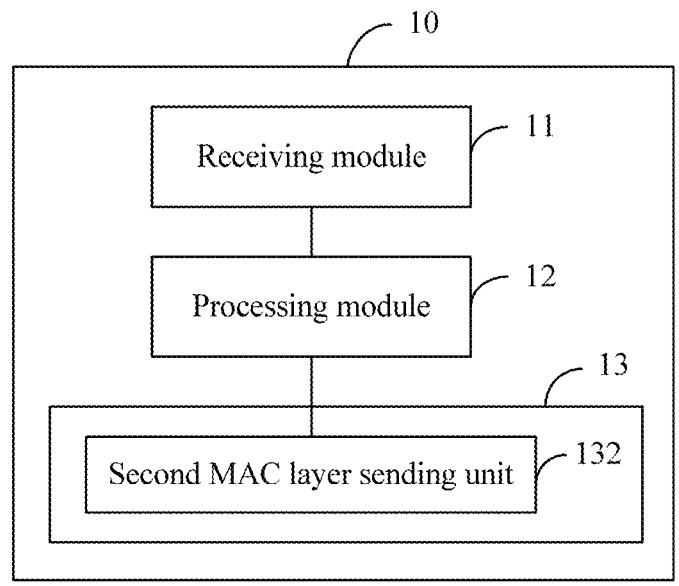
FIG. 14 is a schematic structural diagram of an Internet of Things transmission optimization apparatus according to Embodiment 3 of the present application.

FIG. 14 is a schematic structural diagram of an Internet of Things transmission optimization apparatus according to Embodiment 3 of the present application. As shown in FIG. 14, the sending module 13 includes: a second MAC layer sending unit 132, configured to send an acknowledgement message to the transmitter side device using a pre-obtained first resource used to send an acknowledgement character (ACK) of a MAC PDU corresponding to the PDU, where the acknowledgement message includes the ACK and the first indication information.

The Internet of Things transmission optimization apparatus provided in this embodiment is configured to perform the technical solutions of the receiver side device in the embodiments shown in FIG. 2 to FIG. 8. An implementation principle and a technical solution of the apparatus are similar to those of the receiver side device, and are not described herein again.

Figure 15:
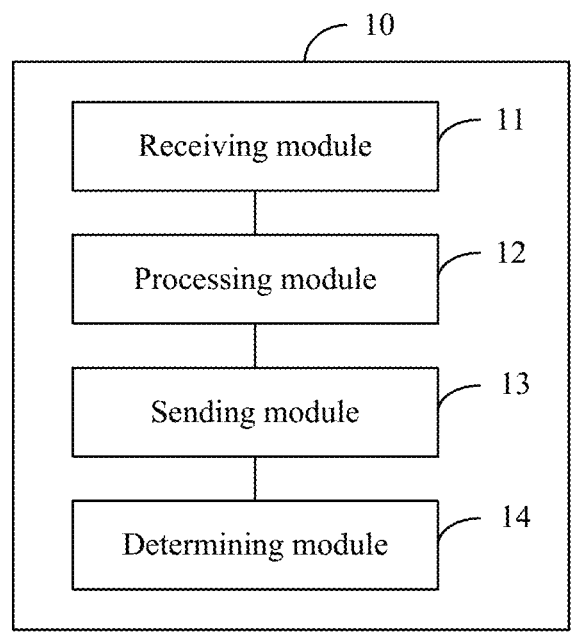
FIG. 15 is a schematic structural diagram of an Internet of Things transmission optimization apparatus according to Embodiment 4 of the present application.

FIG. 15 is a schematic structural diagram of an Internet of Things transmission optimization apparatus according to Embodiment 4 of the present application. As shown in FIG. 15, if the first indication information indicates that the Internet of Things transmission optimization apparatus 10 is to send a status report, the Internet of Things transmission optimization apparatus 10 further includes: a determining module 14, configured to determine a second resource used to send a status report.

The processing module 12 is further configured to generate a status report.

The sending module 13 is further configured to send the status report to the transmitter side device using the second resource.

The Internet of Things transmission optimization apparatus provided in this embodiment is configured to perform the technical solutions of the receiver side device in the embodiments shown in FIG. 2 to FIG. 8. An implementation principle and a technical solution of the apparatus are similar to those of the receiver side device, and are not described herein again.

Figure 16:
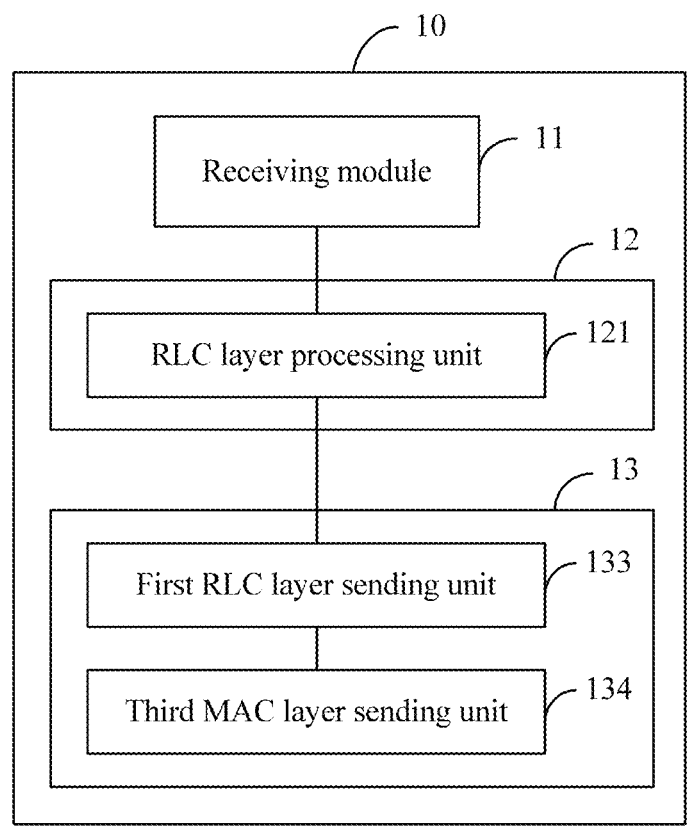
FIG. 16 is a schematic structural diagram of an Internet of Things transmission optimization apparatus according to Embodiment 5 of the present application.

FIG. 16 is a schematic structural diagram of an Internet of Things transmission optimization apparatus according to Embodiment 5 of the present application. As shown in FIG. 16, if the PDU is an RLC PDU, the processing module 12 includes an RLC layer processing unit 121, configured to generate the status report.

The sending module 13 further includes: a first RLC layer sending unit 133, configured to send the status report to the MAC layer of the Internet of Things transmission optimization apparatus; and a third MAC layer sending unit 134, configured to send the status report to the transmitter side device using the second resource.

Optionally, the first indication information generated by the processing module 12 includes n bits, n is a positive integer, and n indicates a quantity of RLC entities.

The Internet of Things transmission optimization apparatus provided in this embodiment is configured to perform the technical solutions of the receiver side device in the embodiments shown in FIG. 2 to FIG. 8. An implementation principle and a technical solution of the apparatus are similar to those of the receiver side device, and are not described herein again.

Figure 17:
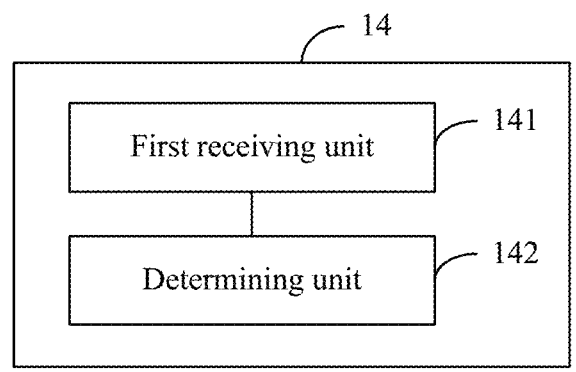
FIG. 17 is a schematic structural diagram of an Internet of Things transmission optimization apparatus according to Embodiment 6 of the present application.

FIG. 17 is a schematic structural diagram of an Internet of Things transmission optimization apparatus according to Embodiment 6 of the present application. As shown in FIG. 17, if the Internet of Things transmission optimization apparatus 10 is user equipment, and the transmitter side device is a base station, the determining module 14 includes: a first receiving unit 141, configured to receive second resource information that is used to send the status report and that is sent by the base station; and a determining unit 142, configured to determine the second resource based on the second resource information.

Optionally, the receiving module 11 is further configured to receive first resource information that is used to send the first indication information and that is sent by the base station.

The determining module 14 is further configured to determine the first resource based on the first resource information.

The Internet of Things transmission optimization apparatus provided in this embodiment is configured to perform the technical solutions of the receiver side device in the embodiments shown in FIG. 2 to FIG. 8. An implementation principle and a technical solution of the apparatus are similar to those of the receiver side device, and are not described herein again.

Figure 18:
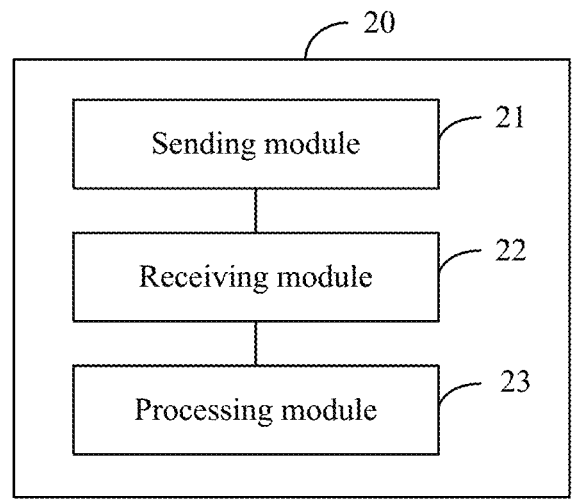
FIG. 18 is a schematic structural diagram of an Internet of Things transmission optimization apparatus according to Embodiment 7 of the present application.

FIG. 18 is a schematic structural diagram of an Internet of Things transmission optimization apparatus according to Embodiment 7 of the present application. As shown in FIG. 18, the Internet of Things transmission optimization apparatus 20 includes: a sending module 21, configured to send a last PDU to a receiver side device; a receiving module 22, configured to receive first indication information sent by the receiver side device; and a processing module 23, configured to determine, based on the acknowledgement message, whether the receiver side device is to send a status report, where the first indication information is information that is generated by the receiver side device and that indicates whether the receiver side device is to send a status report.

If the processing module 23 determines, based on the first indication information, that the receiver side device is to send no status report, the processing module 23 is further configured to determine that all PDUs sent by the sending module 21 are received by the receiver side device.

Optionally, if the processing module 23 determines, based on the first indication information, that the receiver side device is to send a status report, the receiving module 22 is further configured to receive, on a second resource used to send a status report, a status report sent by the receiver side device.

Optionally, the PDU sent by the sending module 21 is a PDU at a protocol layer above a MAC layer.

The Internet of Things transmission optimization apparatus provided in this embodiment is configured to perform the technical solutions of the transmitter side device in the embodiments shown in FIG. 2 to FIG. 8, and an implementation principle and a technical effect of the apparatus are similar to those of the transmitter side device. The sending module sends the PDU to the receiver side device, the receiving module receives the first indication information sent by the receiver side device, and the processing module determines, based on the first indication information, whether the receiver side device is to send a status report. If the processing module determines that the receiver side device is to send no status report, the processing module may determine that all the sent PDUs are correctly received; or if the processing module determines that the receiver side device is to send a status report, the processing module determines that there is an unsuccessfully received PDU, and therefore the transmitter side device receives the status report sent by the receiver side device, and retransmits the unsuccessfully transmitted PDU indicated by the status report, so as not to receive a status report for each PDU while improving transmission reliability, thereby effectively reducing network system signaling overheads.

Figure 19:
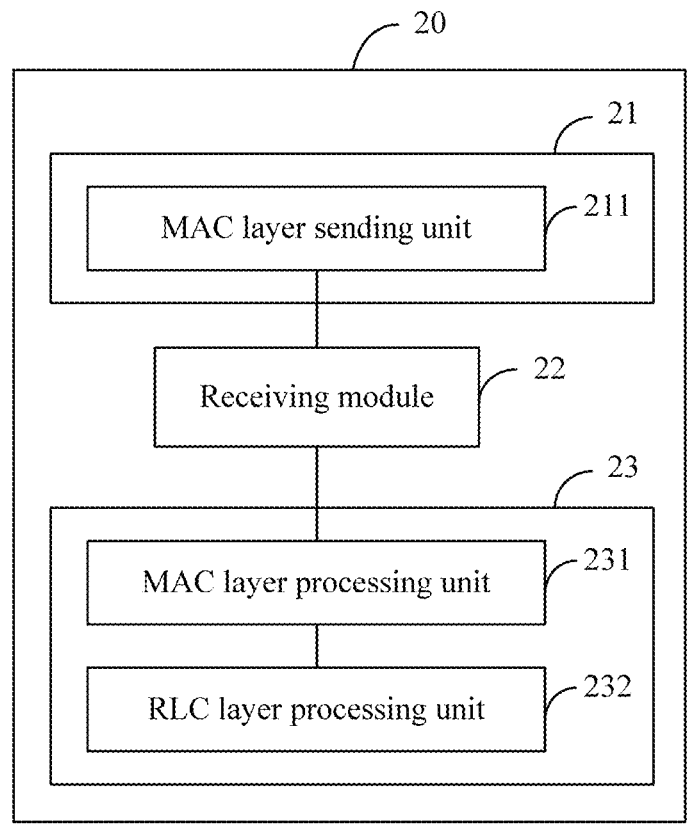
FIG. 19 is a schematic structural diagram of an Internet of Things transmission optimization apparatus according to Embodiment 8 of the present application.

FIG. 19 is a schematic structural diagram of an Internet of Things transmission optimization apparatus according to Embodiment 8 of the present application. As shown in FIG. 19, on the basis of the foregoing embodiment, if the PDU is an RLC PDU at an RLC layer, the processing module 23 includes a MAC layer processing unit 231 and an RLC layer processing unit 232. The sending module 21 includes a MAC layer sending unit 211.

If the MAC layer processing unit 231 determines, based on the first indication information, that the receiver side device is to send no status report, the MAC layer sending unit 211 is configured to send a transmission acknowledgement message to an RLC layer of the transmission optimization apparatus 20, so that the RLC layer processing unit 232 determines that all RLC PDUs sent by the sending module 21 are received; or the MAC layer sending unit 211 sends the first indication information to an RLC layer of the Internet of Things transmission optimization apparatus 20, and the RLC layer of the Internet of Things transmission optimization apparatus 20 determines, based on the first indication information, that all sent RLC PDUs are received.

Optionally, the receiving module 22 is further configured to receive an acknowledgement message sent by the receiver side device, where the acknowledgement message includes a MAC PDU acknowledgment character corresponding to the PDU and the first indication message.

Optionally, the first indication information received by the receiving module 22 includes n bits, n is a positive integer, and n indicates a quantity of RLC entities.

The Internet of Things transmission optimization apparatus provided in this embodiment is configured to perform the technical solutions of the transmitter side device in the embodiments shown in FIG. 2 to FIG. 8. An implementation principle and a technical effect of the apparatus are similar to those of the transmitter side device, and are not described herein again.

Figure 20:
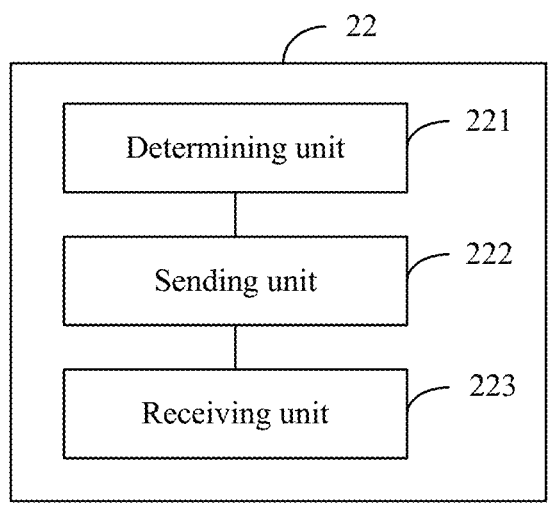
FIG. 20 is a schematic structural diagram of an Internet of Things transmission optimization apparatus according to Embodiment 9 of the present application.

FIG. 20 is a schematic structural diagram of an Internet of Things transmission optimization apparatus according to Embodiment 9 of the present application. As shown in FIG. 20, if the receiver side device is user equipment, and the Internet of Things transmission optimization apparatus 20 is a base station, the receiving module 22 includes: a determining unit 221, configured to determine the second resource information used to send a status report; a sending unit 222, configured to send the second resource information to the user equipment; and a receiving unit 223, configured to receive a status report sent by the user equipment on the second resource.

The Internet of Things transmission optimization apparatus provided in this embodiment is configured to perform the technical solutions of the transmitter side device in the embodiments shown in FIG. 2 to FIG. 8. An implementation principle and a technical effect of the apparatus are similar to those of the transmitter side device, and are not described herein again.

Figure 21:
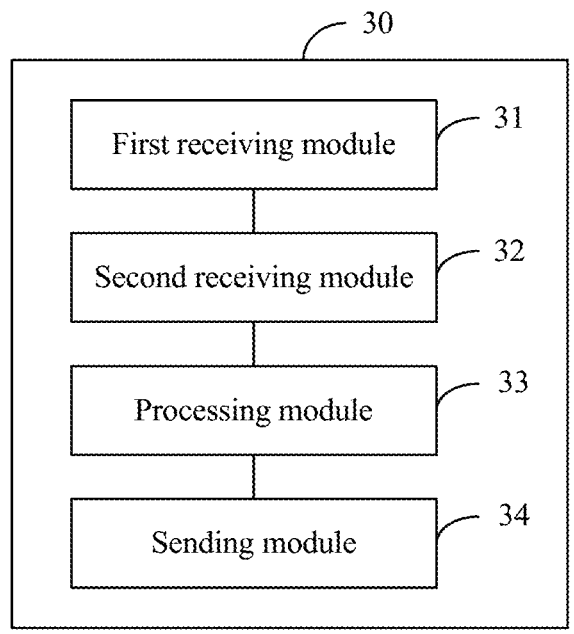
FIG. 21 is a schematic structural diagram of an Internet of Things transmission optimization apparatus according to Embodiment 10 of the present application.

FIG. 21 is a schematic structural diagram of an Internet of Things transmission optimization apparatus according to Embodiment 10 of the present application. As shown in FIG. 21, the Internet of Things transmission optimization apparatus 30 includes: a first receiving module 31, configured to receive a last protocol data unit (PDU) sent by a base station; a second receiving module 32, configured to receive first resource information that is used for a status report and that is sent by the base station; a processing module 33, configured to generate a status report; and a sending module 34, configured to send the status report to the base station using a first resource corresponding to the first resource information.

The Internet of Things transmission optimization apparatus provided in this embodiment is configured to perform the technical solutions of the UE in the embodiments shown in FIG. 9 to FIG. 11, and an implementation principle and a technical effect of the apparatus are similar to those of the UE. After the first receiving module receives the last PDU sent by the base station, the base station actively schedules the resource required for the status report and notifies the UE of the resource, and the sending module sends the status report on the resource scheduled by the base station. In other words, the base station directly schedules an uplink resource for the UE, so as to prevent the UE from obtaining a resource in a random access manner, an application manner, or another manner. In this way, system signaling overheads are effectively reduced, and power consumption is reduced.

Figure 22:
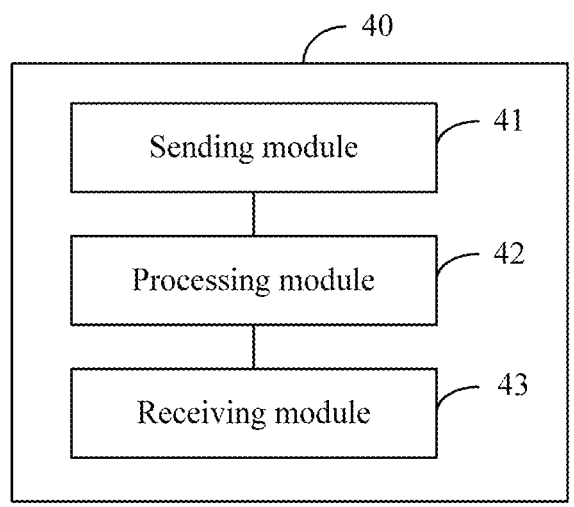
FIG. 22 is a schematic structural diagram of an Internet of Things transmission optimization apparatus according to Embodiment 11 of the present application.

FIG. 22 is a schematic structural diagram of an Internet of Things transmission optimization apparatus according to Embodiment 11 of the present application. As shown in FIG. 22, the Internet of Things transmission optimization apparatus 40 includes: a sending module 41, configured to send a last protocol data unit (PDU) to user equipment; a processing module 42, configured to schedule, for the user equipment, first resource information used for a status report; where the sending module 41 is further configured to send the first resource information to the user equipment; and a receiving module 43, configured to receive, on a first resource corresponding to the first resource information, a status report sent by the user equipment.

Optionally, before the processing module 42 schedules, for the user equipment, the first resource information used for a status report, the receiving module 43 is further configured to receive an acknowledgement character (ACK) that corresponds to the PDU and that is sent by the user equipment.

The Internet of Things transmission optimization apparatus provided in this embodiment is configured to perform the technical solutions of the base station in the method embodiments shown in FIG. 9 to FIG. 11. After the sending module sends the last PDU to the UE, the processing module actively schedules the resource required for the status report, and the sending module notifies the UE of the resource. The UE sends the status report on the scheduled resource. In other words, an uplink resource is directly scheduled for the UE, so as to prevent the UE from obtaining a resource in a random access manner, an application manner, or another manner. In this way, system signaling overheads are effectively reduced, and power consumption is reduced.

Figure 23:
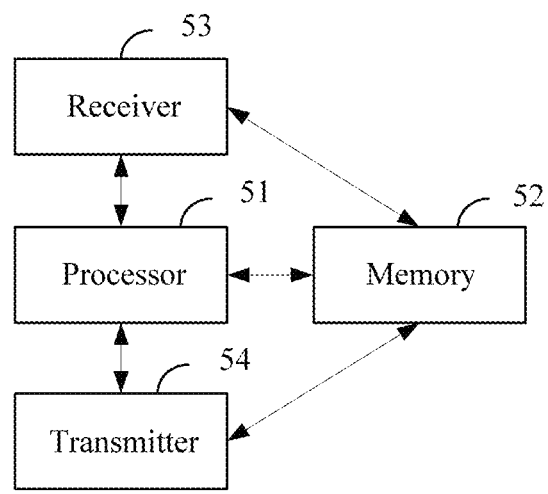
FIG. 23 is a schematic structural diagram of a receiver side device according to Embodiment 1 of the present application.

FIG. 23 is a schematic structural diagram of a receiver side device according to Embodiment 1 of the present application. As shown in FIG. 23, the receiver side device includes a processor 51 configured to control execution of an executable instruction, a memory 52 configured to store the executable instruction of the processor, a receiver 53, and a transmitter 54.

The receiver 53 is configured to receive a protocol data unit PDU sent by a transmitter side device.

The processor 51 is configured to generate first indication information when the receiver receives a last PDU sent by the transmitter side device, where the first indication information is indicates whether the receiver side device is to send a status report.

The transmitter 54 is configured to send the first indication information to the transmitter side device, so that the transmitter side device determines, based on the first indication information, whether the receiver side device is to send a status report.

The receiver side device provided in this embodiment is configured to perform the technical solutions of the receiver side device in the method embodiments shown in FIG. 2 to FIG. 8, and implementation principles and technical effects of the receiver side devices are similar.

Figure 24:
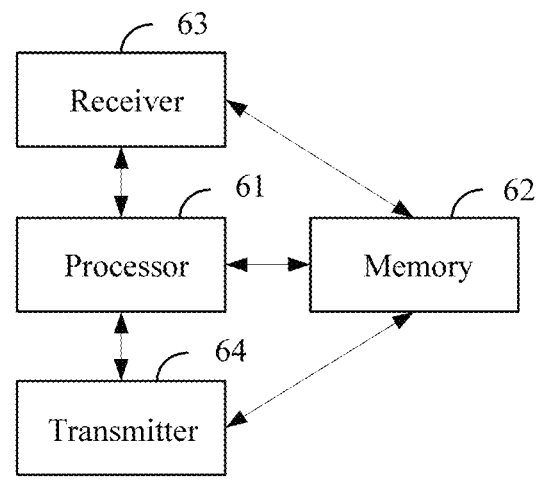
FIG. 24 is a schematic structural diagram of a transmitter side device according to Embodiment 1 of the present application.

FIG. 24 is a schematic structural diagram of a transmitter side device according to Embodiment 1 of the present application. As shown in FIG. 24, the transmitter side device includes a processor 61 configured to control execution of an executable instruction, a memory 62 configured to store the executable instruction of the processor, a receiver 63, and a transmitter 64.

The transmitter 64 is configured to send a last protocol data unit (PDU) to a receiver side device.

The receiver 63 is configured to receive first indication information sent by the receiver side device.

The processor 61 is configured to determine, based on the acknowledgement message, whether the receiver side device is to send a status report, where the first indication information is information that is generated by the receiver side device and that indicates whether the receiver side device is to send a status report.

If the processor 61 determines, based on the first indication information, that the receiver side device is to send no status report, the processor 61 is further configured to determine that all PDUs sent by the transmitter are received by the receiver side device.

The transmitter side device provided in this embodiment is configured to perform the technical solutions of the transmitter side device in the method embodiments shown in FIG. 2 to FIG. 8, and implementation principles and technical effects of the transmitter side devices are similar.

Figure 25:
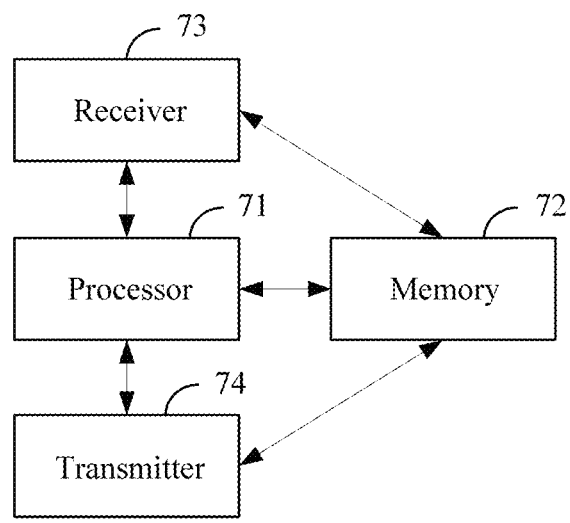
FIG. 25 is a schematic structural diagram of user equipment according to Embodiment 1 of the present application.

FIG. 25 is a schematic structural diagram of user equipment according to Embodiment 1 of the present application. As shown in FIG. 25, the user equipment includes a processor 71 configured to control execution of an executable instruction, a memory 72 configured to store the executable instruction of the processor, a receiver 73, and a transmitter 74.

The receiver 73 is configured to: receive a last protocol data unit PDU sent by a base station; and receive first resource information that is used for a status report and that is sent by the base station.

The processor 71 is configured to generate a status report.

The transmitter 74 is configured to send the status report to the base station using a first resource corresponding to the first resource information.

The user equipment provided in this embodiment is configured to perform the technical solutions of the user equipment in the method embodiments shown in FIG. 9 to FIG. 11, and implementation principles and technical effects of the user equipment are similar.

Figure 26:
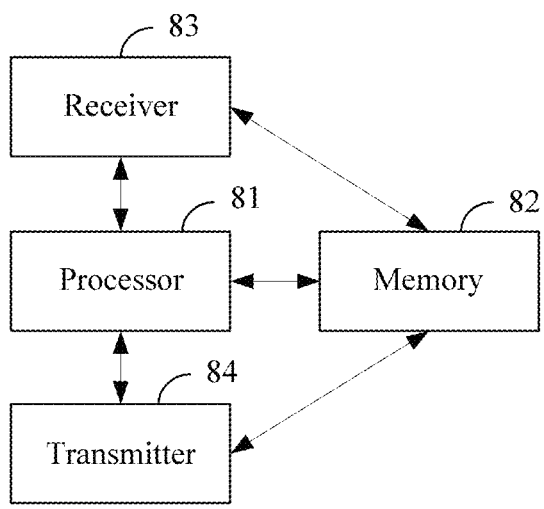
FIG. 26 is a schematic structural diagram of a base station according to Embodiment 1 of the present application.

FIG. 26 is a schematic structural diagram of a base station according to Embodiment 1 of the present application. As shown in FIG. 26, the base station includes a processor 81 configured to control execution of an executable instruction, a memory 82 configured to store the executable instruction of the processor, a receiver 83, and a transmitter 84.

The transmitter 84 is configured to send a last protocol data unit (PDU) to user equipment.

The processor 81 is configured to schedule, for the user equipment, first resource information used for a status report.

The transmitter 84 is further configured to send the first resource information to the user equipment.

The receiver 83 is configured to receive, on a first resource corresponding to the first resource information, a status report sent by the user equipment.

The base station provided in this embodiment is configured to perform the technical solutions of the base station in the method embodiments shown in FIG. 9 to FIG. 11. Implementation principles and technical effects of the base stations are similar, and details are not described herein again.

Figure 27:
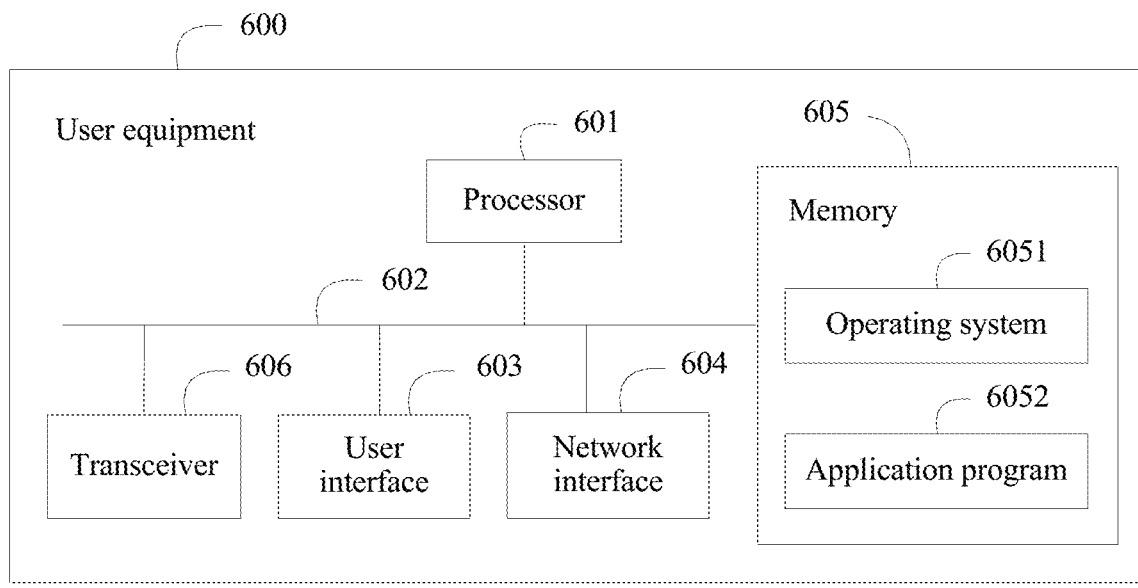
FIG. 27 is a schematic structural diagram of user equipment according to Embodiment 2 of the present application.

FIG. 27 is a schematic structural diagram of user equipment according to Embodiment 2 of the present application. As shown in FIG. 27, the user equipment 600 includes at least one processor 601, at least one network interface 604 or at least one other user interface 603, a memory 605, at least one communications bus 602, and a transceiver 606. The communications bus 602 is configured to implement connection and communication between the components. Optionally, the user equipment 600 includes the user interface 603. The user interface 603 includes a display (such as a touchscreen, an LCD, a CRT, a holographic imaging device, or a projector), a keyboard, or a click device (such as a mouse, a trackball, a touchpad, or a touchscreen).

The memory 605 may include a read-only memory and a random access memory, and provide an instruction and data to the processor 601. A part of the memory 605 may be specifically implemented as a read-only memory (ROM), a RAM, a flash memory, a hard disk, a solid state disk, a magnetic tape, a floppy disk, an optical disc, or any combination thereof.

In this solution, the transceiver 606 may specifically include a transmitter circuit and a receiver circuit, and a carrier thereof, so that the user equipment 600 and a base station or a radio network router can perform data transmission and reception with each other. The transmitter circuit and the receiver circuit may be coupled to an antenna for implementation.

In some implementations, the memory 605 stores the following elements: an executable module or a data structure, or a subset thereof, or an extended set thereof: an operating system 6051, including various system programs, such as a framework layer, a kernel library layer, and a driver layer, and configured to implement various basic services and process a hardware-based task; and an application program module 6052, including various application programs, such as a launcher, a media player, and a browser shown in FIG. 1, and configured to implement various application services.

In this embodiment of the present application, the processor 601 invokes a program or an instruction stored in the memory 605, to control execution of the solutions of the UE serving as a receiver side device or a transmitter side device in the method embodiments.

Figure 28:
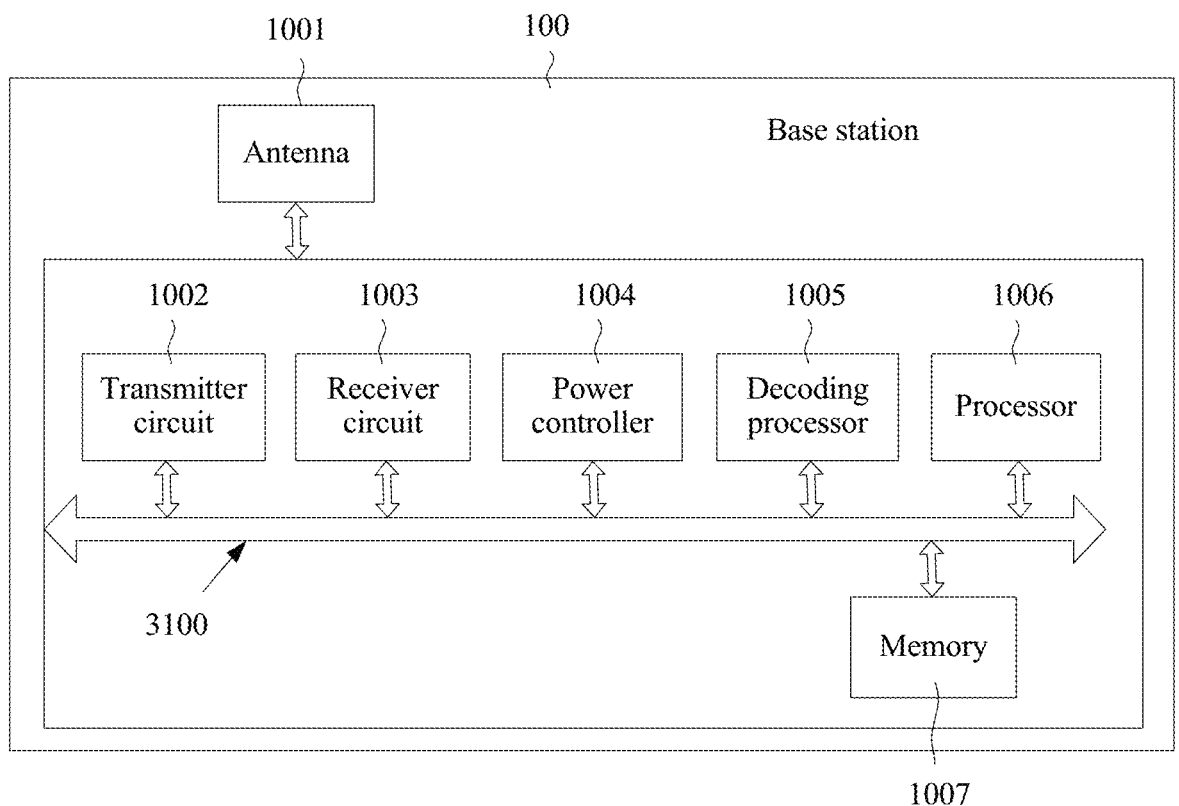
FIG. 28 is a schematic structural diagram of a base station according to Embodiment 2 of the present application.

FIG. 28 is a schematic structural diagram of a base station according to Embodiment 2 of the present application. As shown in FIG. 28, the base station 100 includes a transmitter circuit 1002, a receiver circuit 1003, a power controller 1004, a processor 1006, a memory 1007, and an antenna 1001. The processor 1006 controls an operation of the base station 100. The memory 1007 may include a read-only memory and a random access memory, and provide an instruction and data to the processor 1006. A part of the memory 1007 may further include a nonvolatile random access memory (NVRAM). In a specific application, the base station 100 may be another wireless communications device, and may further include a carrier that holds the transmitter circuit 1002 and the receiver circuit 1003, so that the base station 100 and a remote position can perform data transmission and reception with each other. The transmitter circuit 1002 and the receiver circuit 1003 may be coupled to the antenna 1001. All components of the base station 100 are coupled together using a bus system 3100. In addition to a data bus, the bus system 3100 includes a power bus, a control bus, and a status signal bus. However, for clarity of description, various buses are marked as the bus system 3100 in the figure. The base station 100 may further include a decoding processor 1005.

The base station provided in this embodiment is configured to perform the technical solutions of the base station serving as a receiver side device or a transmitter side device in the method embodiments shown in FIG. 2 to FIG. 11. Implementation principles and technical effects of the base stations are similar, and details are not described herein again.

In the foregoing embodiment of the receiver side device, the transmitter side device, the user equipment, or the base station, it should be understood that the processor may be a central processing unit (CPU), or may be another general-purpose processor, a digital signal processor (DSP), an application-specific integrated circuit (ASIC), or the like. The general-purpose processor may be a microprocessor or the processor may be any conventional processor or the like. The steps of the methods disclosed with reference to the embodiments of the present invention may be directly performed and completed by a hardware processor, or may be performed and completed using a combination of hardware and software modules in the processor.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: a read-only memory (ROM), a RAM, a flash memory, a hard disk, a solid state drive, a magnetic tape, a floppy disk, an optical disc, or any combination thereof.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A method comprising:
generating, by a receiver-side device, first indication information, wherein the first indication information indicates that the receiver-side device will subsequently send a status report when a protocol data unit (PDU) of a plurality of PDUs sent by a transmitter-side device using a cellular network protocol is not successfully received and that the receiver-side device will not subsequently send a status report when all PDUs of the plurality of PDUs are successfully received; and
sending, by the receiver-side device, the first indication information to the transmitter-side device.

2. The method according to claim 1, wherein the receiver-side device generates the first indication information when a last PDU sent by the transmitter-side device is received, and wherein the last PDU is at a protocol layer above a Media Access Control (MAC) layer.

3. The method according to claim 2, wherein when the last PDU is a Radio Link Control (RLC) PDU at an RLC layer, and wherein the generating, by the receiver-side device, the first indication information comprises:
when the RLC layer of the receiver-side device receives a last RLC PDU sent by the transmitter-side device, generating, by the RLC layer of the receiver-side device, the first indication information; or
when a MAC layer of the receiver-side device forwards, to the RLC layer of the receiver-side device, a received last PDU sent by the transmitter-side device, sending, by the MAC layer of the receiver-side device, query information to the RLC layer of the receiver-side device, wherein the query information queries whether to send a status report to the transmitter-side device, and when the MAC layer of the receiver-side device receives a response indication returned by the RLC layer of the receiver-side device, generating, by the MAC layer of the receiver-side device, the first indication information based on the response indication.

4. The method according to claim 3, wherein the sending, by the receiver-side device, the first indication information to the transmitter-side device comprises:
sending, by the MAC layer of the receiver-side device, the first indication information to the transmitter-side device.

5. The method according to claim 3, wherein the sending, by the receiver-side device, the first indication information to the transmitter-side device comprises:
sending, by the MAC layer of the receiver-side device, an acknowledgement message to the transmitter-side device using a pre-obtained first resource for sending an acknowledgement (ACK) of a MAC PDU corresponding to the last PDU, and wherein the acknowledgement message comprises the ACK and the first indication information.

6. A method comprising:
receiving, by a transmitter-side device, first indication information sent by a receiver-side device, wherein the first indication information is generated by the receiver-side device;
determining, by the transmitter-side device, based on the first indication information, whether the receiver-side device will subsequently send a status report;
when the transmitter-side device determines, based on the first indication information, that the receiver-side device will not subsequently send the status report, determining, by the transmitter-side device, that all protocol data units (PDUs) of one or more PDUs sent from the transmitter-side device to the receiver-side device have been successfully received by the receiver-side device; and
when the transmitter-side device determines, based on the first indication information, that the receiver-side device will subsequently send the status report, determining, by the transmitter-side device, that a PDU of the one or more PDUs sent from the transmitter-side device to the receiver-side device has not been successfully received by the receiver-side device.

7. The method according to claim 6, further comprising:
when the transmitter-side device determines, based on the first indication information, that the receiver-side device will subsequently send the status report, receiving, by the transmitter-side device, on a second resource the status report sent by the receiver-side device.

8. The method according to claim 6, further comprising;
sending, by the transmitter-side device, a last PDU to the receiver-side device, wherein the last PDU is at a protocol layer above a Media Access Control (MAC) layer.

9. The method according to claim 8, wherein when the last PDU is a Radio Link Control (RLC) PDU at an RLC layer, and when the transmitter-side device determines, based on the first indication information, that the receiver-side device will not subsequently send the status report, determining that all PDUs sent from the transmitter-side device to the receiver-side device have been received by the receiver-side device comprises:
when a MAC layer of the transmitter-side device determines, based on the first indication information, that the receiver-side device will not subsequently send the status report, sending, by the MAC layer of the transmitter-side device, a transmission acknowledgement message to the RLC layer of the transmitter-side device; or
sending, by the MAC layer of the transmitter-side device, the first indication information to the RLC layer of the transmitter-side device, and determining, by the RLC layer of the transmitter-side device based on the first indication information, that all RLC PDUs sent from the transmitter-side device to the receiver-side device have been received.

10. The method according to claim 6, wherein the receiving, by the transmitter-side device, the first indication information sent by the receiver-side device comprises:
receiving, by the transmitter-side device, an acknowledgement message sent by the receiver-side device, and wherein the acknowledgement message comprises a MAC PDU acknowledgment character corresponding to a last PDU and the first indication information.

11. An apparatus comprising:
a receiver configured to receive one or more protocol data units (PDUs) sent by a transmitter-side device;
at least one processor configured to generate first indication information, wherein the first indication information indicates that the apparatus will subsequently send a status report when a PDU of the one or more PDUs sent by the transmitter-side device using a cellular network protocol is not successfully received and that the apparatus will not subsequently send a status report when all PDUs of the one or more PDUs are successfully received; and
a transmitter configured to send the first indication information to the transmitter-side device.

12. The apparatus according to claim 11, wherein the at least one processor is configured to generate the first indication information when a last PDU sent by the transmitter-side device is received, and wherein the last PDU received by the receiver is at a protocol layer above a Media Access Control (MAC) layer.

13. The apparatus according to claim 12, wherein the at least one processor is configured to:
when the last PDU is a Radio Link Control (RLC) PDU at an RLC layer, generate the first indication information when the RLC layer of the apparatus receives the last RLC PDU sent by the transmitter-side device; or
when the last PDU is the RLC PDU at the RLC layer, send query information to the RLC layer of the apparatus when a MAC layer of the apparatus forwards, to the RLC layer of the apparatus, a received last PDU sent by the transmitter-side device, wherein the query information queries whether to send a status report to the transmitter-side device, and when the MAC layer of the apparatus receives a response indication returned by the RLC layer of the apparatus, generate, by the MAC layer of the apparatus, the first indication information based on the response indication.

14. The apparatus according to claim 13, wherein the transmitter is further configured to send the first indication information to the transmitter-side device.

15. The apparatus according to claim 13, wherein the transmitter is further configured to send an acknowledgement message to the transmitter-side device using a pre-obtained first resource for sending an acknowledgement character (ACK) of a MAC PDU corresponding to the last PDU, and wherein the acknowledgement message comprises the ACK and the first indication information.

16. The method according to claim 1, wherein the receiver-side device generates the first indication information after a last PDU of the plurality of PDUs is received, the last PDU including a field indicating that the last PDU is a last one of the plurality of PDUs.

17. An apparatus comprising:
a receiver configured to receive first indication information sent by a receiver-side device, wherein the first indication information is generated by the receiver-side device;
at least one processor configured to:
determine, based on the first indication information, whether the receiver-side device will subsequently send a status report;
when the apparatus determines, based on the first indication information, that the receiver-side device will not subsequently send the status report, determine that all protocol data units (PDUs) of one or more PDUs sent from the apparatus to the receiver-side device have been successfully received by the receiver-side device; and
when the apparatus determines, based on the first indication information, that the receiver-side device will subsequently send the status report, determine that a PDU of the one or more PDUs sent from the apparatus to the receiver-side device has not been successfully received by the receiver-side device.

18. The apparatus according to claim 17, the at least one processor further configured to:
when the apparatus determines, based on the first indication information, that the receiver-side device will subsequently send the status report, receive on a second resource the status report sent by the receiver-side device.

19. The apparatus according to claim 17, further comprising:
a transmitter configured to send a last PDU to the receiver-side device, wherein the last PDU is at a protocol layer above a Media Access Control (MAC) layer.

* * * * *